US012228881B2

(12) United States Patent
Matsuda et al.

(10) Patent No.: US 12,228,881 B2
(45) Date of Patent: Feb. 18, 2025

(54) TONER, DEVELOPER, PROCESS CARTRIDGE, IMAGE FORMING APPARATUS, AND IMAGE FORMING METHOD

(71) Applicants: Shoki Matsuda, Kanagawa (JP); Keisuke Tada, Shizuoka (JP); Yasuyuki Sanui, Shizuoka (JP)

(72) Inventors: Shoki Matsuda, Kanagawa (JP); Keisuke Tada, Shizuoka (JP); Yasuyuki Sanui, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/536,261

(22) Filed: Dec. 12, 2023

(65) Prior Publication Data

US 2024/0210847 A1 Jun. 27, 2024

(30) Foreign Application Priority Data

Dec. 15, 2022 (JP) ................................ 2022-200189

(51) Int. Cl.
*G03G 9/08* (2006.01)
*G03G 9/09* (2006.01)
(Continued)

(52) U.S. Cl.
CPC ............ *G03G 9/0821* (2013.01); *G03G 9/09* (2013.01); *G03G 15/08* (2013.01);
(Continued)

(58) Field of Classification Search
CPC ........ G03G 9/0821; G03G 9/09; G03G 15/08; G03G 15/1605; G03G 21/1807; G03G 21/0011
See application file for complete search history.

(56) References Cited

U.S. PATENT DOCUMENTS 5,952,143 A 9/1999 Ootaki et al.
6,177,223 B1 * 1/2001 Hashimoto ............ G03G 9/087 430/110.2
(Continued)

FOREIGN PATENT DOCUMENTS

JP 2002-040705 2/2002
JP 2003-107783 4/2003
(Continued)

*Primary Examiner* — Joseph S Wong
(74) *Attorney, Agent, or Firm* — XSENSUS LLP

(57) ABSTRACT

Yellow toner with excellent cleanability, transferability and device contamination resistance is provided. When intensity of spectrum at wavenumber λ, at which total intensity of Raman spectrums of toner particles from 950 $cm^{-1}$ through 3,250 $cm^{-1}$ in Raman spectroscopy of toner is maximum, is normalized to 1, and distribution is generated for ≥300 particles regarding LC calculated by [LC (%)=$CH_5$ rate (%)−$CH_c$ rate (%)] based on $CH_c$ rate (%) defined as $[(I_{nc}-I_{ave})/I_{ave}]\times100$ and $CH_s$ rate (%) defined as $[(I_{ns}-I_{ave})/I_{ave}]\times100$ where $I_n$ and $I_{ns}$ represent integrated intensities of spectrums of center and surface portions of each particle from 2,750 $cm^{-1}$ through 3,250 $cm^{-1}$, and $I_{ave}$ represents average of $I_{nc}$ and $I_{ns}$ of all particles, percentage by number of particles having LC deviating from LC distribution median by absolute value of ≥25.0; is ≥1.0% by number and ≤25.0% by number.

8 Claims, 9 Drawing Sheets

(51) Int. Cl.

| | |
|---|---|
| ***G03G 15/08*** | (2006.01) |
| ***G03G 15/16*** | (2006.01) |
| ***G03G 21/00*** | (2006.01) |
| ***G03G 21/18*** | (2006.01) |

(52) U.S. Cl.
CPC ..... *G03G 15/1605* (2013.01); *G03G 21/1807* (2013.01); *G03G 21/0011* (2013.01)

(56) References Cited

U.S. PATENT DOCUMENTS

| | | | | |
|---|---|---|---|---|
| 6,183,926 | B1 | 2/2001 | Kuroda et al. | |
| 2003/0157419 | A1 | 8/2003 | Miyakawa et al. | |
| 2011/0136052 | A1 | 6/2011 | Watanabe et al. | |
| 2014/0247687 | A1 | 9/2014 | Mizuno et al. | |
| 2014/0342282 | A1 | 11/2014 | Tada et al. | |
| 2018/0031991 | A1* | 2/2018 | Yamashita | G03G 9/0819 |
| 2020/0209772 | A1 | 7/2020 | Fujino et al. | |
| 2021/0286279 | A1 | 9/2021 | Fujino et al. | |
| 2021/0397105 | A1 | 12/2021 | Fujino et al. | |
| 2023/0095411 | A1* | 3/2023 | Takagi | G03G 9/09725<br>430/108.3 |

FOREIGN PATENT DOCUMENTS

| | | |
|---|---|---|
| JP | 2016-045394 | 4/2016 |
| JP | 2021-056482 | 4/2021 |

* cited by examiner

TONER, DEVELOPER, PROCESS CARTRIDGE, IMAGE FORMING APPARATUS, AND IMAGE FORMING METHOD

CROSS-REFERENCE TO RELATED APPLICATION

The present application claims priority under 35 U.S.C. § 119 to Japanese Patent Application No. 2022-200189, filed Dec. 15, 2022, the contents of which are incorporated herein by reference in their entirety.

BACKGROUND OF THE INVENTION

1. Field of the Invention

The present disclosure relates to a toner, a developer, a process cartridge, an image forming apparatus, and an image forming method.

2. Description of the Related Art

In electrophotographic image formation, an electrostatic charge image (latent image) is formed on an electrostatic latent image bearer and developed with a charged toner conveyed by a developer bearing member, to form a toner image, which is then transferred onto a recording medium such as paper and fixed thereon by such a method as heating, to obtain an output image. A known technique recovers any toner remaining untransferred on the electrostatic latent image bearer from the electrostatic latent image bearer by a cleaning member, and discards it into a waste toner container.

In the developing method, it is very difficult to control all toner particles ideally because toner particles fed into the developing device have variations in, for example, particle diameter, shape, and charging property.

Particles that are nonuniformly mixed with a carrier and cannot be triboelectrically charged, or particles having a low charging property are the cause of contamination in the device, because such particles are beyond control in the device and scatter.

When some toner particles have an extremely strong adhering force to a carrier, a photoconductor, and a transfer belt, the toner cannot be sufficiently transferred, and is consumed more than necessary.

Because these causative particles, even if they are not abundant, lead to malfunctioning of the image system, it is important to narrow the distributions of characteristic values of each and every one of toner particles, and improve their uniformity.

Japanese Unexamined Patent Application Publication No. 2003-107783 proposes use of a flame hydrolyzed-external additive, to narrow the charging amount distribution and improve the transfer efficiency.

Japanese Unexamined Patent Application Publication No. 2002-40705 proposes, in addition to selection of a specific release agent, narrowing of the shape distribution to reduce particles having an excessively irregular shape, to improve the transfer rate.

Japanese Unexamined Patent Application Publication No. 2016-45394 proposes selection of a specific resin, to improve scratch resistance of a fixed image and improve toner scattering resistance, and narrowing of the granularity distribution and spheronization to improve toner scattering resistance.

Japanese Unexamined Patent Application Publication No. 2021-56482 proposes minutely dispersing raw materials to inhibit particle-to-particle variation in the contents of the raw materials in the particles, to improve transferability and device contamination resistance.

The toner of Japanese Unexamined Patent Application Publication No. 2003-107783 has a limitation in improvement of uniformity and has not yet reached a sufficient level of improvement in the transfer rate by narrowing of the charging amount distribution, because the mixing step of mixing the toner base and the external additive cannot avoid nonuniformity in the amount of the external additive to be attached on the toner base or the degree to which the external additive is to be buried in the toner base.

The toner of Japanese Unexamined Patent Application Publication No. 2002-40705 can be seen to have an improved transfer rate by shape spheronization. However, the issue to be achieved is to make the toner satisfy both of an improved transfer rate and cleanability because the spheronized toner slips through a cleaning blade.

The toner of Japanese Unexamined Patent Application Publication No. 2016-45394 has a certain anti-scattering effect by narrowing of the granularity distribution, but has not reached a sufficient uniformity level because occurrence of particle diameter nonuniformity cannot be avoided in the granulation process. Moreover, spheronization worsens the cleaning blade slip-through resistance, and the issue to be achieved is to make the toner satisfy both of scattering resistance improvement and cleanability.

The toner of Japanese Unexamined Patent Application Publication No. 2021-56482 has an improved particle-to-particle uniformity in the contents of raw materials, which has a certain effect on cleanability and device contamination resistance. However, the control has not been able to reach positioning of the raw materials in the particles, and scattering resistance and coloring degree have not reached sufficient improvement levels.

SUMMARY OF THE INVENTION

According to an embodiment, the present disclosure provides a yellow toner including at least:

a binder resin; and a pigment, wherein in a case where an intensity of a Raman spectrum of each toner particle at a wavenumber λ, at which a total intensity obtained by summing up Raman spectrums of toner particles that occur in a wavenumber range of 950 $cm^{-1}$ or greater and 3,250 $cm^{-1}$ or less in Raman spectroscopy of the yellow toner is maximum, is normalized to 1, and when a distribution is generated for 300 or more toner particles regarding LC that is calculated according to a formula (3) below based on a $CH_c$ rate defined by a formula (1) below and a $CH_s$ rate defined by a formula (2) below where $I_n$ represents an integrated intensity of a Raman spectrum of a center portion of each toner particle that occurs in a wavenumber range of 2,750 $cm^{-1}$ or greater and 3,250 $cm^{-1}$ or less and an integrated intensity of a Raman spectrum of a surface portion of each toner particle that occurs in the wavenumber range of 2,750 $cm^{-1}$ or greater and 3,250 $cm^{-1}$ or less, and $I_{ave}$ represents an average value of the $I_n$, a percentage by number of toner particles having the LC that deviates from a median of the distribution of the LC by an absolute value of 25.0% or greater is 1.0% by number or greater and 25.0% by number or less.

$$CH_c \text{ rate } (\%) = \left[(I_{nc} - I_{ave})/I_{ave}\right] \times 100 \quad (1)$$

$$CH_s \text{ rate } (\%) = \left[(I_{ns} - I_{ave})/I_{ave}\right] \times 100 \quad (2)$$

$$LC\ (\%) = CH_s \text{ rate } (\%) - CH_c \text{ rate } (\%) \quad (3)$$

$I_{nc}$: Integrated intensity of the Raman spectrum of the center portion of an n-th toner particle in the wavenumber range of 2,750 $cm^{-1}$ or greater and 3,250 $cm^{-1}$ or less $I_{ns}$: Integrated intensity of the Raman spectrum of the surface portion of the n-th toner particle in the wavenumber range of 2,750 $cm^{-1}$ or greater and 3,250 $cm^{-1}$ or less $I_{ave}$: Average value of $I_n$ of the toner particles including their center portions and surface portions

DESCRIPTION OF THE EMBODIMENTS

Figure 1:
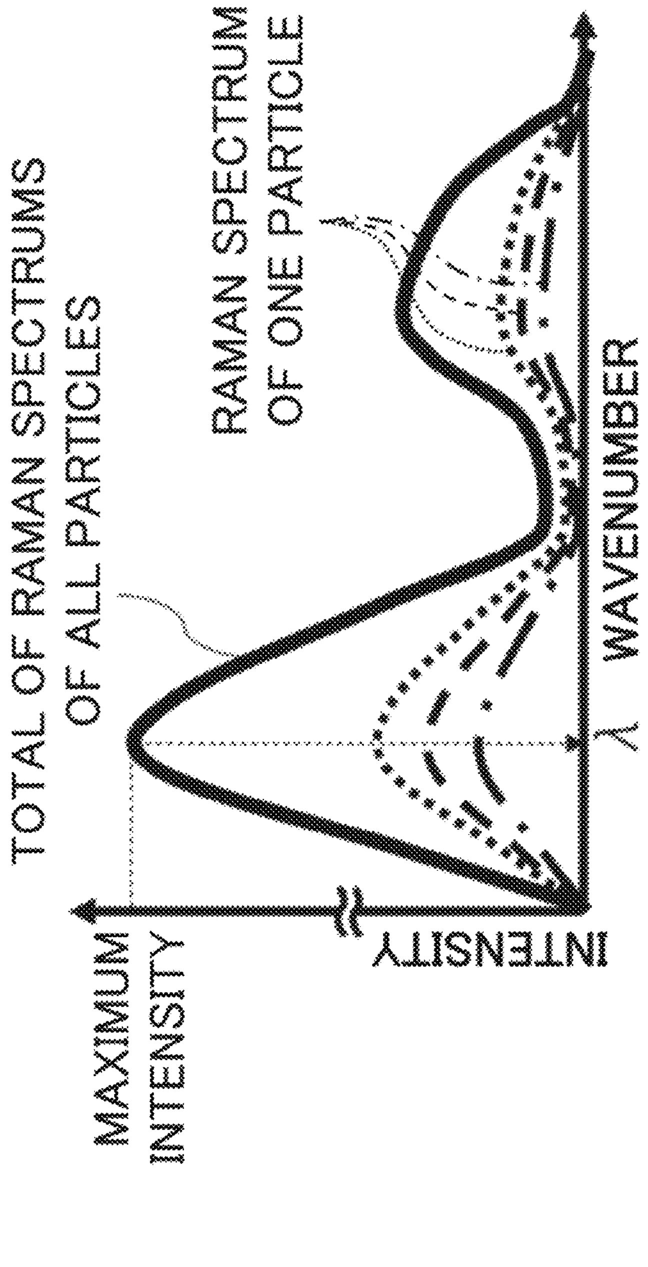
FIG. 1 is a graph illustrating a method for calculating a wavenumber λ at which the intensity of Raman spectrums is maximum.

An object of the present disclosure is to provide a toner having excellent transferability and excellent device contamination resistance without cleanability worsening.

The present disclosure can provide a toner having excellent transferability and excellent device contamination resistance without cleanability worsening.

A toner, a developer, a process cartridge, an image forming apparatus, and an image forming method according to the present disclosure will be described below with reference to the drawings. The present disclosure is not limited to the embodiment described below, and may be modified within a conceivable scope of those skilled in the art by, for example, other embodiments, additions, modifications, and deletions. Any embodiments that have the workings and effects of the present disclosure are included in the scope of the present disclosure.

(Toner)

The toner according to the present disclosure is a yellow toner including at least a binder resin and a pigment. In a case where an intensity of a Raman spectrum of each toner particle at a wavenumber λ, at which a total intensity obtained by summing up Raman spectrums of toner particles that occur in a wavenumber range of 950 $cm^{-1}$ or greater and 3,250 $cm^{-1}$ or less in Raman spectroscopy of the yellow toner is maximum, is normalized to 1, and when a distribution is generated for 300 or more toner particles regarding LC that is calculated according to a formula (3) below based on a $CH_c$ rate defined by a formula (1) below and a $CH_s$ rate defined by a formula (2) below where $I_n$ represents an integrated intensity of a Raman spectrum of a center portion of each toner particle that occurs in a wavenumber range of 2,750 $cm^{-1}$ or greater and 3,250 $cm^{-1}$ or less and an integrated intensity of a Raman spectrum of a surface portion of each toner particle that occurs in the wavenumber range of 2,750 $cm^{-1}$ or greater and 3,250 $cm^{-1}$ or less, and $I_{ave}$ represents an average value of the $I_n$, a percentage by number of toner particles having the LC that deviates from a median of the distribution of the LC by an absolute value of 25.0% or greater is 1.0% by number or greater and 25.0% by number or less.

$$CH_c \text{ rate } (\%) = \left[(I_{nc} - I_{ave})/I_{ave}\right] \times 100 \quad (1)$$

$$CH_s \text{ rate } (\%) = \left[(I_{ns} - I_{ave})/I_{ave}\right] \times 100 \quad (2)$$

$$LC\ (\%) = CH_s \text{ rate } (\%) - CH_c \text{ rate } (\%) \quad (3)$$

$I_{nc}$: Integrated intensity of the Raman spectrum of the center portion of an n-th toner particle in the wavenumber range of 2,750 $cm^{-1}$ or greater and 3,250 $cm^{-1}$ or less $I_{ns}$: Integrated intensity of the Raman spectrum of the surface portion of the n-th toner particle in the wavenumber range of 2,750 $cm^{-1}$ or greater and 3,250 $cm^{-1}$ or less $I_{ave}$: Average value of $I_n$ of the toner particles including their center portions and surface portions The range of 950 $cm^{-1}$ or greater and 2,750 $cm^{-1}$ or less is a spectrum attributable to the pigment, and the range of 2,750 $cm^{-1}$ or greater and 3,250 $cm^{-1}$ or less is a peak attributable to a resin component having a C—H bond.

A plurality of toner particles (300 or more particles) are prepared as a sample, and the wavenumber, at which the total intensity obtained by summing up the Raman spectrums of the toner particles that occur in the wavenumber range of 950 $cm^1$ or greater and 3,250 $cm^{-1}$ or less is maximum, is defined as λ. The intensities of the Raman spectrums of the respective toner particles at the wavenumber λ are normalized to 1, and the peaks of the toner particles attributable to the pigment are uniformized, to make the amount of the pigment in the particles equal or similar.

Next, per particle, the integrated intensity of a center portion of the particle in the range of 2,750 $cm^{-1}$ or higher and 3,250 $cm^{-1}$ or lower is defined as $I_{nc}$, and the integrated intensity of a surface portion of the particle in the range of 2,750 $cm^{-1}$ or higher and 3,250 $cm^{-1}$ or lower is defined as $I_{ns}$. An average value of the $I_{nc}$ and $I_{ns}$ of the plurality of toner particles is defined as $I_{ave}$.

Next, based on the formulae (1) and (2) above, the rates of change of the integrated intensities $I_{nc}$ and $I_{ns}$ of each particle from the average value $I_{ave}$ are calculated as $CH_c$ rate and $CH_s$ rate, which are the indicators of variation of the resin component.

Then, based on the difference between the $CH_c$ rate for the outermost surface portion of a particle and the $CH_s$ rate for the center portion of the particle, "LC (%)" defined by the formula (3) above is evaluated as the indicator of variation.

The details of the present disclosure will be described below.

<Overview of CH Rate>

The CH rate is the acronym of Content Heterogeneity, and is an indicator defined for evaluating heterogeneity of the content of a raw material in the toner. Particularly, the CH rate for a center portion of a particle is defined as $CH_c$ rate, and the CH rate for a surface portion of the particle is defined as $CH_s$ rate. This indicator is for evaluating how much the raw material content proportion in each toner particle deviates from the average value of the raw material content in the toner particles. Naturally, it is preferable that the raw material content proportion in each toner particle does not deviate from the average value of the raw material content.

<Method for Calculating $CH_c$ Rate and $CH_s$ Rate>

CH rates are calculated from the Raman spectrum of the toner.

The "$CH_c$ rate" and the "$CH_s$ rate" in the present disclosure are values represented by a formula (1) and a formula (2) below, where $I_{nc}$ represents the integrated intensity of the Raman spectrum of the center portion of each toner particle that occurs in the wavenumber range of 2,750 $cm^{-1}$ or higher and 3,250 cm or lower in Raman spectroscopy of the toner, $I_{ns}$ represents the integrated intensity of the Raman spectrum of the surface portion of the toner particle that occurs in the wavenumber range of 2,750 $cm^{-1}$ or higher and 3,250 $cm^1$ or lower in Raman spectroscopy of the toner, and Ian represents the average value of the $I_{nc}$ and $I_{ns}$ of all of the toner particles.

$$CH_c \text{ rate } (\%) = \left[(I_{nc} - I_{ave})/I_{ave}\right] \times 100 \quad (1)$$

$$CH_s \text{ rate } (\%) = \left[(I_{ns} - I_{ave})/I_{ave}\right] \times 100 \quad (2)$$

The Raman spectrum is measured using a Raman microscope. The instrument to be used is not particularly limited. For example, "XploRA PLUS" (available from HORIBA, Ltd.) is used for the measurement. The Raman spectrum is measured for each one of the toner particles. After spectrums are measured from 300 or more particles, the $CH_c$ rate and the $CH_s$ rate are calculated based on the formula (1) and the formula (2) above.

<Conditions for Raman Spectrum Measurement>

(1) Selection of Exciting Laser

For measurement of the Raman spectrum, a laser having an excitation wavelength of 638 nm is used. Each one of the toner particles is irradiated with the laser to measure the Raman spectrum. The laser intensity is adjusted to an intensity at which the toner does not melt.

(2) Number of Particles to be Measured

The spectrum shape slightly varies from toner particle to toner particle. In order to evaluate the variation, 300 or more toner particles are measured. It is more preferable to measure a greater number of particles.

(3) Measurement Wavenumber Range

Because the analysis is performed by using a range of 950 $cm^{-1}$ or greater and 3,250 $cm^{-1}$ or less, it is necessary to measure a wavenumber range including this range.

A fluorescence spectrum tends to be measured simultaneously when a Raman spectrum is measured. In order to make it easier to remove the fluorescence spectrum, it is preferable to perform measurement in a rather wide wavenumber range, and it is preferable to perform measurement in a range of approximately from 200 $cm^{-1}$ through 3,800 $cm^{-1}$.

(4) Conditions for Focal Point Adjustment

The focal point is adjusted to be on the center of a toner particle. After a Raman spectrum is measured, the focal point is re-adjusted to be on the outermost surface, and measurement is performed again.

(5) Other Setting Items

As other measurement conditions relating to the resolution of the Raman spectrum, the measurement is performed at an objective lens magnification of ×100, and at a resolution setting at which the intervals at which the Raman spectrum is plotted in the wavenumber domain is approximately from 3 $cm^{-1}$ through 4 $cm^{-1}$.

<Sample Production Method>

For measurement of the toner particles one by one, the interval between toner particles is preferably 5 μm or greater. A sample is produced by dispersing the toner on a glass slide using, for example, a powder dispersing device.

<Raman Spectrum Correction>

Because a Raman spectrum includes effects of fluorescence and noise, it is preferable to correct the baseline of the spectrum data.

The method for baseline correction is not particularly limited. An example of the processing method for the correction is described below.

The baseline correction for a spectrum is performed using software "LABSPEC 6.0" (available from HORIBA, Ltd.).

(1) A wavenumber range of from 200 cm through 3,800 $cm^{-1}$ of the measured Raman spectrum is extracted.

(2) The baseline correction of the (1) described above is performed at "Order: 9", "Maximum score: 57", and "Noise score: 4".

(3) A wavenumber range of 950 $cm^1$ or greater and 3,250 $cm^{-1}$ or less of the spectrum of the (2) described above is extracted again.

<Raman Spectrum Normalization>

The Raman spectrum intensities of toner particles cannot be simply compared, because the Raman spectrum intensity varies depending on, for example, the size and shape of the measurement target and the type of the raw material. Hence, Raman spectrums are normalized to enable comparison of different toner particles. Using data editing software (e.g., EXCEL), the normalization process is applied to the spectrums subjected to the baseline correction.

Normalization is performed by the method described below. For all Raman spectrums measured from the center portions and the surface portions of the toner particles,

[1] Total spectrums, each of which is the sum of Raman spectrums as illustrated in FIG. 1, are calculated, and a wavenumber λ at which the maximum intensity total spectrum occurs is obtained, and

Figure 2:
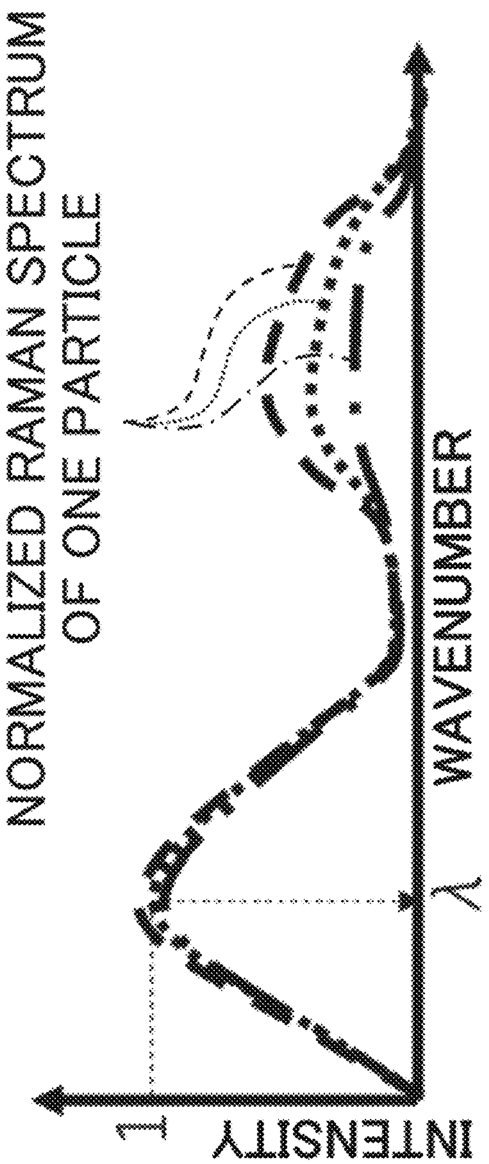
FIG. 2 is a graph illustrating a normalization method for adjusting the intensity at a wavenumber λ, at which a maximum intensity is obtained, to 1.

[2] A correction coefficient X(n) that adjusts the intensity of the Raman spectrum of an n-th particle at the wavenumber λ to 1 is calculated as illustrated in FIG. 2, and the spectrum of the n-th particle is multiplied by the correction coefficient X(n) all over the full wavenumber range, to normalize the spectrum intensity.

The same is performed for the Raman spectrums of all of the particles.

<Noise Data Exclusion>

Data of, for example, dust, which may become noise, may have been acquired in the Raman spectrum measurement. It may be impossible to correctly evaluate the Raman spectrum by counting in such data as the target for the CH rate calculation. Hence, noise data is excluded as follows.

The spectrum area S(n) of the normalized spectrum of the n-th particle of [2] described above is calculated. The same is performed for all of the particles.

The standard deviation a(S) of the S(n) of all of the particles is calculated, and particles (n) that do not satisfy $S(n)-2\times\sigma(S)\leq S(n)\leq S(n)+2\times\sigma(S)$ are treated as error data and excluded from the targets for which the CH rate is calculated.

<$CH_c$ Rate and $CH_s$ Rate Calculation>

Figure 3:
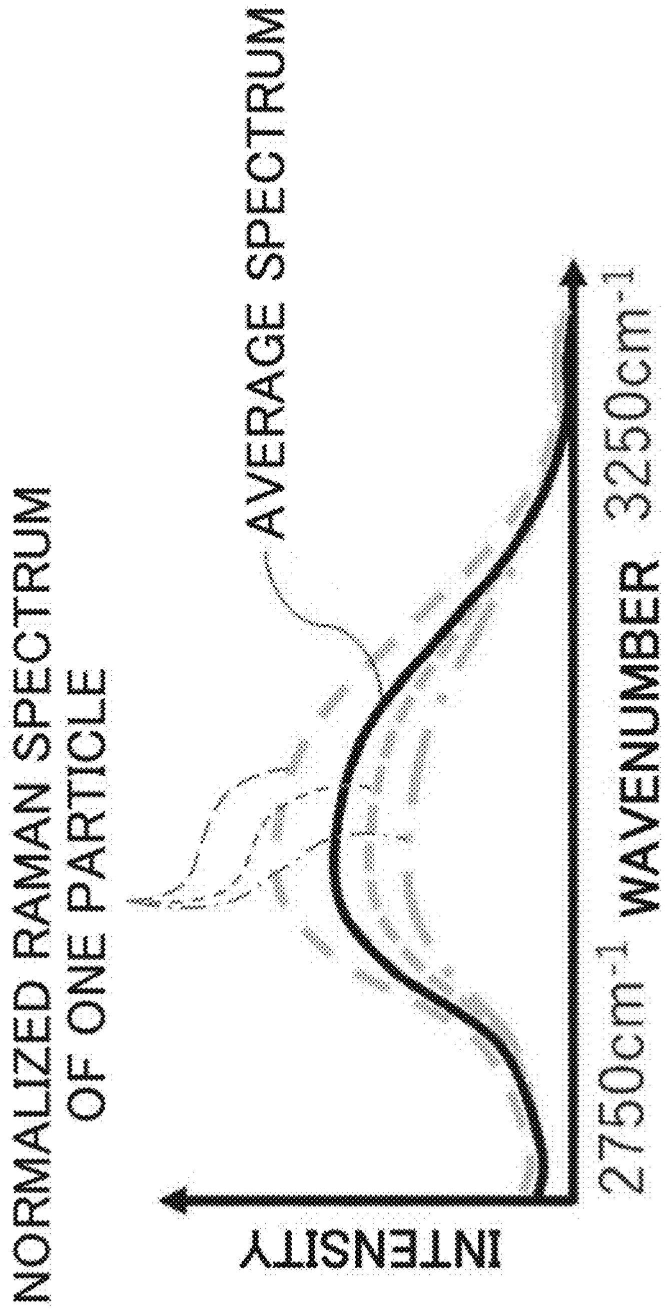
FIG. 3 is a graph illustrating calculation of an average spectrum in a range of 2,750 $cm^{-1}$ or greater and 3,250 $cm^{-1}$ or less.

FIG. 3 is a graph illustrating the range of 2,750 $cm^{-1}$ or greater and 3,250 $cm^{-1}$ or less of FIG. 2.

An average spectrum is obtained based on particles (n) that are not excluded by the noise data exclusion process.

Figure 4:
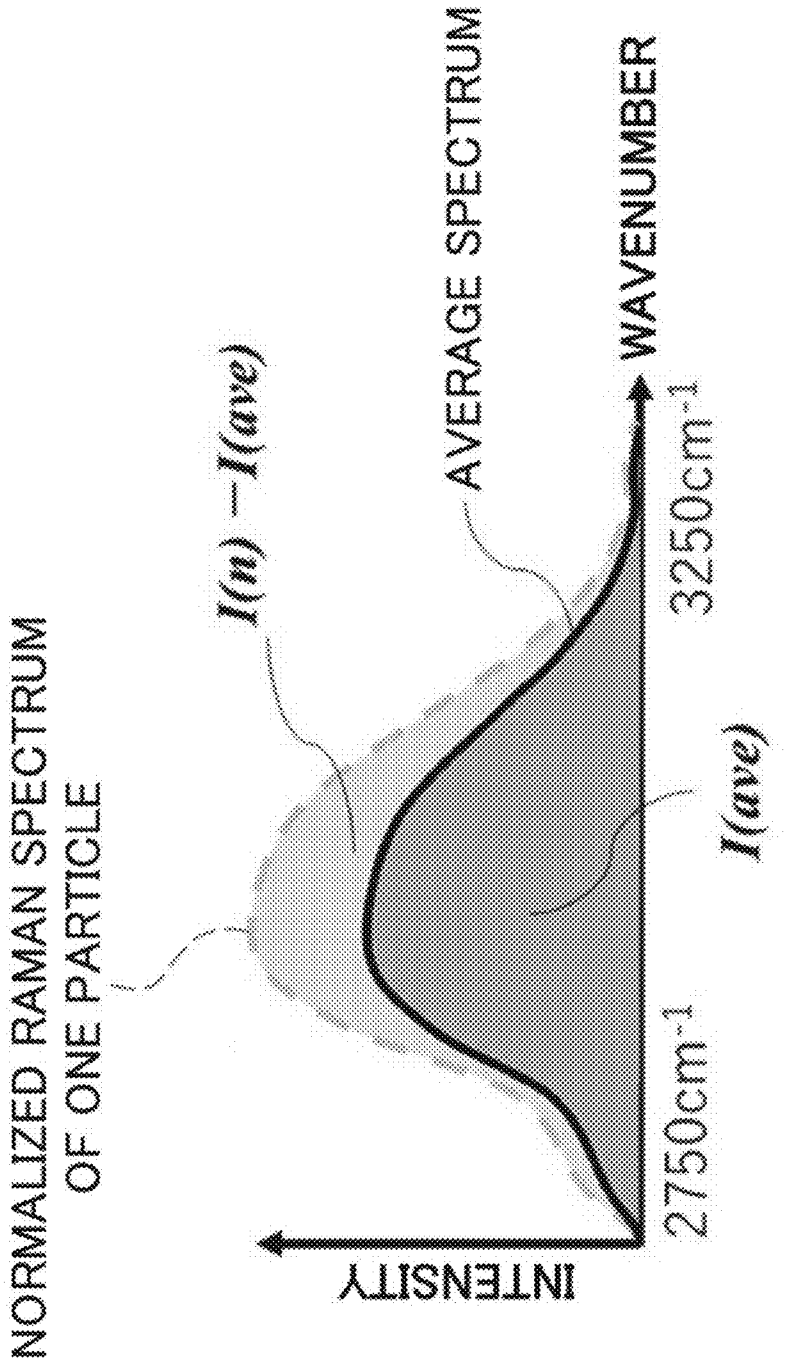
FIG. 4 is a graph illustrating calculation of a $CH_c$ rate or a $CH_s$ rate from a difference of a spectrum of one particle from an average spectrum.

FIG. 4 illustrates the average spectrum obtained in FIG. 3 and the spectrum of the particle (n) in an overlapping manner.

An average value calculated based on the integrated intensities $I_n$ calculated from the center portions and surface portions of all of the particles (n) in the range of 2,750 $cm^{-1}$ or greater and 3,250 $cm^{-1}$ or less is defined as $I_{ave}$.

A value ($CH_c$ rate) defined by a formula (1) below is calculated, and a value ($CH_5$ rate) defined by a formula (2) below relating to measurement of a surface of a toner particle is calculated, where $I_{nc}$ represents the integrated intensity of the Raman spectrum of a center portion of a particle, and $I_{ns}$ represents the integrated intensity of the Raman spectrum of a surface portion of the particle.

$$CH_c \text{ rate } (\%) = \left[(I_{nc} - I_{ave})/I_{ave}\right] \times 100 \tag{1}$$

$$CH_s \text{ rate } (\%) = \left[(I_{ns} - I_{ave})/I_{ave}\right] \times 100 \tag{2}$$

$I_{nc}$: Integrated intensity of the Raman spectrum of the center portion of an n-th toner particle in the wavenumber range of 2,750 $cm^{-1}$ or greater and 3,250 $cm^{-1}$ or less $I_{ns}$: Integrated intensity of the Raman spectrum of the surface portion of the n-th toner particle in the wavenumber range of 2,750 $cm^{-1}$ or greater and 3,250 $cm^{-1}$ or less $I_{ave}$: Average value of $I_n$ of all of the toner particles including their center portions and surface portions Because the Raman spectrum intensity varies depending on the type of the raw material used, the $CH_c$ rate and the $CH_s$ rate are not calculated as a difference between $I_n$, and $I_{ave}$, but are calculated as the change rate as defined by the formula (1) and the formula (2) based on the same idea as the coefficient of variation (CV).

By analyzing the range of 2,750 $cm^{-1}$ or greater and 3,250 $cm^{-1}$ or less in which pigment spectrums typically almost do not occur, it is possible to accurately evaluate the variation in the content of the raw material other than the pigment.

<Overview of LC>

LC is the acronym of Localization Coefficient, and is an indicator for evaluating the difference in the raw material content proportion between the center and the surface of the same toner particle. When designing a toner, it is known that positioning of each raw material in the toner has a considerable effect on the performance of the toner. However, the optimal solution for how to position the raw material is different depending on, for example, the raw material used and the production method. It may be preferable to have different raw material content proportions between the center of a particle and the surface of the particle in some cases, whereas it may contrarily be preferable to have the same raw material content proportion in the center of a particle and in the surface of the particle in other cases. This is determined based on the design concept of the toner. However, irrespective of the design concept, the same raw material positioning in different particles is naturally preferred. Occurrence of positioning difference between particles means the failure to produce a toner of the intended design concept.

<LC Calculation>

When the CH rate when the surface of a toner particle is measured is defined as $CH_s$ rate and the CH rate when the center of the toner particle is measured is defined as $CH_c$, the localization coefficient LC is calculated according to a formula (3) below.

$$LC\ (\%) = CH_s \text{ rate } (\%) - CH_c \text{ rate } (\%) \tag{3}$$

<Distribution of LC>

Figure 5:
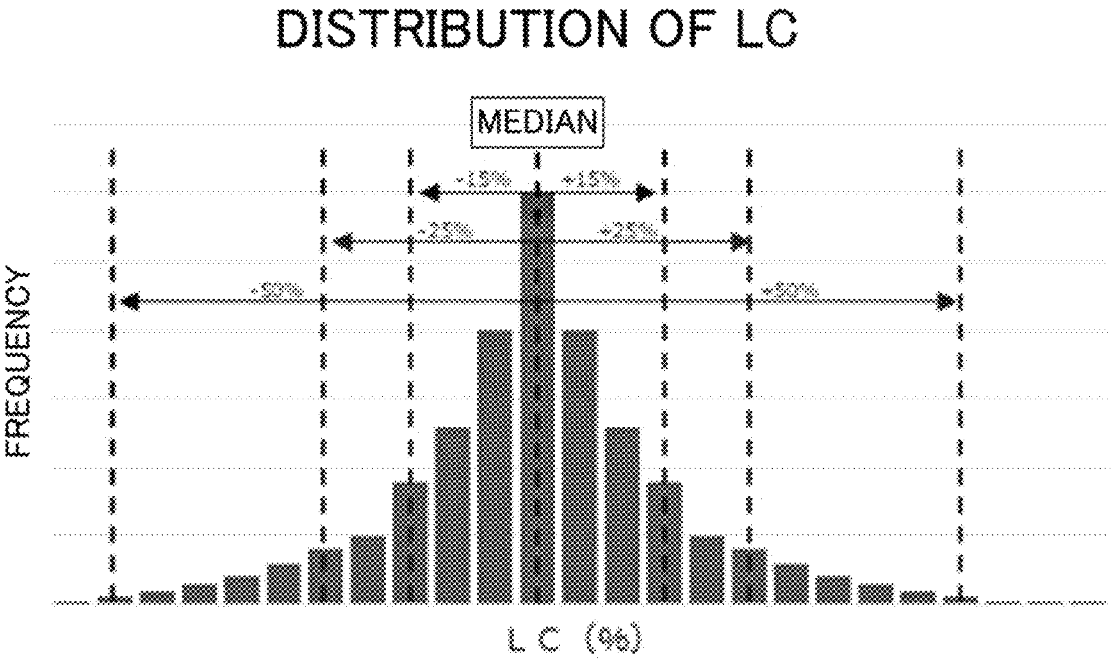
FIG. 5 is a concept graph of a distribution of LC.

FIG. 5 is a concept graph when LC is calculated for each particle and a distribution of LC of all particles is generated. When a toner can be produced exactly as the design concept in terms of raw material positioning in the toner, the distribution is narrow. When a toner cannot be produced as the design concept requires, the distribution is broad. Particularly, particles that deviate from the median of the distribution by an absolute value of 25.0% or greater cannot exert the designed function sufficiently. Particles that deviate from the median by an absolute value of 50.0% or greater have a performance considerably short of the designed function, and some of these particles may become the cause of device contamination and worsening of scattering, as abnormal particles.

As a result of earnest studies into the issue of how to satisfy all of transferability, device contamination resistance, and cleanability, the present inventors have found it important that the percentage by number of toner particles having LC that deviates from the median of the distribution of LC by an absolute value of 25.0% or greater is 1.0% by number or greater and 25.0% by number or less, and preferably 5.0% by number or greater and 15.0% by number or less, where LC represents uniformity of the raw material positioning from particle to particle.

It is not preferable that the percentage by number of particles having LC that deviates from the median of the distribution of LC by the absolute value of 25.0% or greater is greater than 25% by number, because the device contamination inhibiting effect and the transferability improving effect are insufficient.

Moreover, deviation of pigment positioning in the particles from the design concept varies the color tone from particle to particle, and becomes the cause of reduction in the coloring degree. On the other hand, when the percentage by number of particles having LC that deviates from the median of the distribution of LC by the absolute value of 25.0% or greater is less than 1.0% by number, toner particles that would cause background smear are significantly reduced, but a dam on a cleaning blade portion, which hitherto has been formed by background smear toner particles, would be insufficient and may cause a cleaning failure.

The present inventors have also found it important that the percentage by number of particles having LC that deviates from the median of the distribution of LC by an absolute value of 50.0% or greater is 3.0% by number or less, and preferably 1.5% by number or less.

Particles having LC that deviates from the median of the distribution of LC by the absolute value of 50.0% or greater are generally outside the skirts of the distribution, and are extremely compositionally different particles deviating from the normal distribution. Such particles may become the cause of a transfer failure, but what should be particularly mentioned about them is their readiness to scatter in the device. Moreover, such particles also have pigment positioning variation, giving rise to particles having color unevenness. By reducing the percentage of particles having LC that deviates from the median of the distribution of LC by the absolute value of 50.0; or greater, it is possible to improve scattering resistance and color unevenness resistance.

The method for producing the toner according to the present disclosure is not particularly limited.

In a kneading pulverizing method, it is preferable to pulverize the raw materials in a state in which they are minutely dispersed in the binder resin as uniformly as possible, by, for example, previous minute dispersion of the raw materials, strength enhancement in the kneading step, and inhibition of re-aggregation by temperature control.

As a chemical method, a dissolution suspension method will be described in detail as an example.

A toner composition containing at least a binder resin, a colorant, and a release agent is dissolved in an organic solvent, and the materials are subsequently broken into minute pieces by a shear force or a collision force. Here, by using a shear force and a collision force in combination, it is possible to efficiently reduce toner particles that have LC that deviates from the median of the distribution of LC by the absolute value of 25.0% or greater and have raw material positioning different from the intended design.

The dispersion method is not particularly limited. For minute dispersion by shearing, it is preferable to use a method of pulverizing the materials by a high shear force that is produced in a narrow gap between a rotor and a stator. For minute dispersion by collision, it is preferable to use a method of pulverizing the materials by collision between beads or between beads and a vessel, the collision being produced by rotating the vessel that is filled with the beads made of, for example, zirconia.

Pulverization by collision is particularly effective for a large material having a particle diameter greater than 1 μm, whereas pulverization by shearing is effective for making a material on a sub-micron order more minute.

The pulverization target ranges of the two methods are different. Hence, by using the methods in combination, it is possible to improve uniformity of the materials. Hence, it is particularly preferable to use the two methods in combination. The order between the dispersion by shearing and the dispersion by collision is not limited.

In order to make the materials minute efficiently, the rotor peripheral velocity in the minute dispersion by shearing is preferably higher than 12 m/s. In the pulverization by collision, the disk peripheral velocity is preferably 6 m/s or higher, and more preferably 10 m/s or higher and 12 m/s or lower. When the disk peripheral velocity in the pulverization by collision is lower than 6 m/s, the materials cannot be sufficiently dispersed because a pulverizing energy by sufficient collision cannot be obtained and imbalanced positioning of the beads occurs. Conversely, when the disk peripheral velocity is increased excessively, the materials are excessively dispersed, risking worsening of cleanability due to reduction of the background smear toner. Moreover, there is also a risk of re-aggregation due to liquid temperature rising and excessive dispersion.

The media diameter of the beads is preferably 0.5 mm or less and more preferably 0.3 mm or less. As the beads are smaller, the total surface area of the beads is larger. Hence, the chances of dispersion by collision increase, and the dispersion efficiency improves. If the beads are excessively small, it is necessary to also narrow the mesh size of a screen for separating the beads from the process liquid. This leads to a risk of re-aggregation due to liquid temperature rising due to failure to output at a substantial flow rate.

In order to reduce toner particles having LC that deviates from the median of the distribution of LC by the absolute value of 25.0% or greater and having raw material positioning different from the intended design, it is also effective to disperse the raw materials by adding an inorganic substance having a greater hardness than that of the organic substances such as the pigment and the release agent in the dispersion liquid.

The inorganic substance is not particularly limited. A case of adding montmorillonite, which is an organically modified layered inorganic mineral, will be described below as an example.

A toner composition containing an organically modified layered inorganic mineral in addition to at least a binder resin, a colorant, and a release agent is dissolved in an organic solvent, and then the materials are broken into minute pieces by a collision force using a media-type dispersion device. It is possible to minutely disperse the materials more efficiently, and to reduce compositionally nonuniform toner particles better than when the organically modified layered inorganic mineral is omitted. This is because chances of collision occur also between the beads and the inorganic substance and between the vessel and the inorganic substance in addition to between the beads and between the beads and the vessel, making it possible to effectively disperse the organic substances having a low hardness.

Adding an inorganic substance in the rotor-stator-type shear dispersion does not increase the pulverization efficiency, and it is important to use an inorganic substance as the pulverization media.

The adding amount of the inorganic substance is preferably 0.2% by mass or greater and 2.0% by mass or less and more preferably 0.7% by mass or greater and 1.5% by mass or less relative to the total solid components. When the adding amount of the inorganic substance is 0.2% by mass or greater and 2.0% by mass or less, the function as the pulverization media is sufficiently exerted, and the distribution of LC becomes narrow.

For example, the shape and size of the toner are not particularly limited and may be appropriately selected in accordance with the intended purpose. For example, an average circularity, a volume average particle diameter, and a ratio of the volume average particle diameter to a number average particle diameter (volume average particle diameter/number average particle diameter) specified below are preferable.

The average circularity is a value obtained by dividing the perimeter of an equivalent circle having the same area as a projected area of the shape of the toner by the perimeter of an actual particle, and is preferably, for example, 0.950 or greater and 0.980 or less and more preferably 0.960 or greater and 0.975 or less. It is preferable that the percentage by number of particles having an average circularity less than 0.950 is 15.0% by number or less.

When the average circularity is less than 0.950, it may be impossible to obtain a satisfactory transferability and a high-quality image free of dust particles. When the average circularity is greater than 0.980, cleaning failures of, for example, the photoconductor and the transfer belt may occur in an image forming system employing, for example, blade cleaning, and smear on an image may occur, such as background smear by an image, which may occur when an image having a high image area proportion, such as a photographic image is formed and the toner forming the image, which remains untransferred due to, for example, a paper feeding failure, accumulates on the photoconductor as a toner remaining untransferred. Moreover, for example, a charging roller configured to charge the photoconductor by contacting the photoconductor may be contaminated by the toner, and cannot exert its intended charging capability.

The average circularity can be measured using a flow-type particle image analyzer ("FPIA-2100", available from Sysmex Corporation), and can be analyzed using analyzing software (FPIA-2100 DATA PROCESSING PROGRAM FOR FPIA VERSION 00-10).

In a specific example, a 10% by mass surfactant (alkylbenzene sulfonate salt, NEOGEN SC-A, available from DKS Co. Ltd.) (from 0.1 mL through 0.5 mL) is added into a 100 mL beaker made of glass, and the toner (from 0.1 g through 0.5 g) is added into the beaker. The materials in the beaker are mixed using a microspartel, and then ion-exchanged water (80 mL) is added. The obtained dispersion liquid is subjected to dispersion treatment using an ultrasonic disperser (available from Honda Electronics Co., Ltd.) for 3 minutes. The shape and distribution of the toner are continuously measured using the FPIA-2100 until the concentration in the dispersion liquid becomes from 5,000 particles/μL through 15,000 particles/μL.

In this measuring method, it is important to adjust the concentration in the dispersion liquid to from 5,000 particles/μL through 15,000 particles/μL in terms of measurement reproducibility of the average circularity. In order to obtain this dispersion liquid concentration, the conditions for the dispersion liquid, i.e., the amount of the surfactant to be added and the amount of the toner to be added need to be changed. The needed amount of the surfactant varies depending on the hydrophobicity of the toner as when measuring the toner particle diameter mentioned above. When the surfactant is added more than necessary, noise occurs due to bubbles. When the surfactant is added less than necessary, the toner cannot be wetted sufficiently, and cannot be dispersed sufficiently. The amount of the toner to be added varies depending on the particle diameter. It is necessary to add the toner in a small amount when the toner has a small particle diameter, and it is necessary to add the toner in a large amount when the toner has a large particle diameter. When the toner particle diameter is 3 μm or greater and 10 μm or less, it is possible to adjust the dispersion liquid concentration to from 5,000 particles/μL or higher and 15,000 particles/μL or lower by adding the toner in an amount of 0.1 g or greater and 0.5 g or less.

The volume average particle diameter of the toner is not particularly limited, may be appropriately selected in accordance with the intended purpose, and is preferably, for example, 3 μm or greater and 10 μm or less and more preferably 4 μm or greater and 7 μm or less. When the volume average particle diameter of the toner is less than 3 μm, the toner, if contained in a two-component developer, fuses with the surface of the carrier along with being stirred in the developing device on a long-term basis, and reduces the charging capacity of the carrier. When the volume average particle diameter of the toner is greater than 10 μm, it becomes difficult to obtain a high-resolution high-quality image, and a large variation may occur in the toner particle diameter when toner income and outgo occurs in the developer.

The ratio of the volume average particle diameter to the number average particle diameter (volume average particle diameter/number average particle diameter) of the toner is preferably 1.00 or greater and 1.25 or less and more preferably 1.00 or greater and 1.15 or less.

The volume average particle diameter and the ratio of the volume average particle diameter to the number average particle diameter (volume average particle diameter/number average particle diameter) can be measured using a granularity measurement system ("MULTISIZER III", available from Beckman Coulter, $I_{nc}$.) at an aperture diameter of 100 μm, and can be analyzed using analyzing software (BECKMAN COULTER MULTISIZER 3 VERSION 3.51).

In a specific example, a 10% by mass surfactant (alkylbenzene sulfonate salt, NEOGEN SC-A, available from DKS Co. Ltd.) (0.5 mL) is added into a 100 mL beaker made of glass, and the toner (0.5 g) is added into the beaker. The materials in the beaker are mixed using a microspartel, and then ion-exchanged water (80 mL) is added. The obtained dispersion liquid is subjected to dispersion treatment using an ultrasonic disperser (W-113MK-II, available from Honda Electronics Co., Ltd.) for 10 minutes. The dispersion liquid can be measured using the MULTISIZER III and using ISOTON III (available from Beckman Coulter, $I_{nc}$.) as a solution for measurement.

In the measurement, the toner sample dispersion liquid is dropped such that the concentration indicated by the measurement system becomes 8±2%.

In terms of particle diameter measurement reproducibility of this measuring method, it is important to adjust the concentration to 8±2%. In this concentration range, a sampling error does not occur in the particle diameter.

<Toner Raw Materials>

The toner of the present disclosure may contain other components as needed in the toner base containing at least a binder resin and a release agent, and contains an external additive as needed.

<<Binder resin>>

The binder resin is not particularly limited and may be appropriately selected in accordance with the intended purpose. Examples of the binder resin include polyester resins, silicone resins, styrene acrylic resins, styrene resins, acrylic resins epoxy resins, diene-based resins, phenol resins, terpene resins, coumarin resins, amide imide resins, butyral resins, urethane resins, and ethylene vinyl acetate resins. One of these binder resins may be used alone or two or more of these binder resins may be used in combination. Among these binder resins, the polyester resins, and resins obtained by combining the polyester resins with any other of the binder resins are preferable because they have excellent low-temperature fixability, and have a sufficient flexibility even when they are reduced in the molecular weight.

—Polyester Resin—

The polyester resin is not particularly limited and may be appropriately selected in accordance with the intended purpose. Unmodified polyester resins and modified polyester resins are preferable. One of these polyester resins may be used alone or two or more of these polyester resins may be used in combination.

—Unmodified Polyester Resin—

The unmodified polyester resin is not particularly limited and may be appropriately selected in accordance with the intended purpose. Examples of the unmodified polyester resin include a resin obtained by poly-esterifying a polyol represented by a general formula (1) below and a polycarboxylic acid represented by a general formula (2) below, and crystalline polyester resins.

$$A—[OH]_m \qquad \text{General formula (1)}$$

$$B—[COOH]_n \qquad \text{General formula (2)}$$

In the general formula (1), A represents an alkyl group containing from 1 through 20 carbon atoms, an alkylene group, or an aromatic group or a heterocyclic aromatic group that may contain a substituent, and m represents an integer of from 2 through 4. In the general formula (2), B represents an alkyl group containing from 1 through 20 carbon atoms, an alkylene group, or an aromatic group or a heterocyclic aromatic group that may contain a substituent, and n represents an integer of from 2 through 4.

The polyol represented by the general formula (1) is not particularly limited and may be appropriately selected in accordance with the intended purpose. Examples of the polyol include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol polytetramethylene glycol, sorbitol, 1,2,3,6-hexantetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethyl benzene. One of these polyols may be used alone or two or more of these polyols may be used in combination.

The polycarboxylic acid represented by the general formula (2) is not particularly limited and may be appropriately selected in accordance with the intended purpose. Examples of the polycarboxylic acid include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isooctyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, empol trimer acids, cyclohexane dicarboxylic acid, cyclohexene dicarboxylic acid, butane tetracarboxylic acid, diphenyl sulfone tetracarboxylic acid, and ethylene glycol bis(trimellitic acid). One of these polycarboxylic acids may be used alone or two or more of these polycarboxylic acids may be used in combination.

—Modified polyester resin—

The modified polyester resin is not particularly limited and may be appropriately selected in accordance with the intended purpose. Examples of the modified polyester resin include resins obtained through either or both of elongation reaction and cross-linking reaction between active hydrogen group-containing compounds and polyesters reactive with the active hydrogen group-containing compounds (hereinafter, may be referred to as "polyester prepolymers"). Either or both of the elongation reaction and the cross-linking reaction may be terminated using a reaction terminating agent (e.g., products obtained by blocking monoamines, such as diethylamine, dibutyl amine, butylamine, lauryl amine, and ketimine compounds) as needed.

—Active hydrogen group-containing compound—

The active hydrogen group-containing compound serves as, for example, an elongation agent and a cross-linking agent when the polyester prepolymer undergoes, for example, elongation reaction and cross-linking reaction in a water phase.

The active hydrogen group-containing compound is not particularly limited and may be appropriately selected in accordance with the intended purpose so long as it contains an active hydrogen group. Particularly when the polyester prepolymer is an isocyanate group-containing polyester prepolymer described below, amines are preferable as the active hydrogen group-containing compound because the molecular weight of the polyester prepolymer can be increased.

The active hydrogen group is not particularly limited and may be appropriately selected in accordance with the intended purpose. Examples of the active hydrogen group include a hydroxyl group (an alcoholic hydroxyl group or a phenolic hydroxyl group), an amino group, a carboxyl group, and a mercapto group. The active hydrogen group-containing compound may contain one of these active hydrogen groups alone or two or more of these active hydrogen groups in combination.

The amines as the active hydrogen group-containing compounds are not particularly limited and may be appropriately selected in accordance with the intended purpose. Examples of the amines include diamines, trivalent or greater polyamines, amino alcohols, amino mercaptans, amino acids, and products obtained by blocking the amino group of these amines.

Examples of the diamines include: aromatic diamines (e.g., phenylenediamine, diethyl toluene diamine, and 4,4' diaminodiphenylmethane); alicyclic diamines (e.g., 4,4'-diamino-3,3' dimethyl dicyclohexyl methane, diamine cyclohexane, isophoronediamines); and aliphatic diamines (e.g., ethylene diamine, tetramethylene diamine, and hexamethylenediamine).

Examples of the trivalent or greater polyamines include diethylenetriamine, and triethylene tetramine.

Examples of the amino alcohols include ethanol amine, and hydroxyethyl aniline.

Examples of the amino mercaptans include aminoethyl mercaptan, and aminopropyl mercaptan.

Examples of the amino acids include amino propionic acid, and amino caproic acid.

Examples of the products obtained by blocking the amino group of the amines include ketimine compounds obtained from any selected from the amines (e.g., diamines, trivalent or greater polyamines, amino alcohols, amino mercaptans, and amino acids) and ketones (e.g., acetone, methyl ethyl ketone, and methyl isobutyl ketone), and oxazolizone compounds.

One of these active hydrogen group-containing compounds may be used alone or two or more of these active hydrogen group-containing compounds may be used in combination. As the amines among the active hydrogen group-containing compounds, diamines, and mixtures of the diamines with small amounts of the trivalent or greater polyamines are particularly preferable.

—Polymer Reactive with Active Hydrogen Group-Containing Compound—

The polymer reactive with the active hydrogen group-containing compound is not particularly limited and may be appropriately selected in accordance with the intended purpose so long as it is a polymer containing at least a group reactive with the active hydrogen group-containing compound.

Particularly, urea bond producing group-containing polyesters (RMPE) are preferable, and isocyanate group-containing polyester prepolymers are more preferable because they have excellent high flowability and excellent transparency during melting, are can be easily adjusted in terms of polymeric component molecular weight, and can impart excellent oil-less low-temperature fixability and releasability to a dry toner.

The isocyanate group-containing polyester prepolymer is not particularly limited and may be appropriately selected in accordance with the intended purpose. Examples of the isocyanate group-containing polyester prepolymer include a polycondensate of a polyol and a polycarboxylic acid, and a product obtained by reacting an active hydrogen group-containing polyester resin with a polyisocyanate.

The polyol is not particularly limited and may be appropriately selected in accordance with the intended purpose. Examples of the polyol include: alkylene glycol (e.g., ethylene glycol, 1,2-propylene glycol, 1,3-propylene glycol, 1,4-butanediol, and 1,6-hexanediol); alkylene ether glycol (e.g., diethylene glycol, triethylene glycol, dipropylene glycol, polyethylene glycol, polypropylene glycol, and polytetramethylene ether glycol); alicyclic diol (e.g., 1,4-cyclohexane dimethanol, and hydrogenated bisphenol A); bisphenols (e.g., bisphenol A, bisphenol F, and bisphenol S); multivalent aliphatic alcohol (e.g., glycerin, trimethylolethane, trimethylolpropane, pentaerythritol, and sorbitol); trivalent or greater phenols (e.g., phenol novolac and cresol novolac); trivalent or greater polyols such as an adduct of a trivalent or greater polyphenol with alkylene oxide; and a mixture of diol with a trivalent or greater polyol.

One of these polyols may be used alone or two or more of these polyols may be used in combination. Among these polyols, the diol alone, and a mixture of the diol with a small amount of the trivalent or greater polyol are preferable as the polyol.

It is preferable that the diol contains, as main components, alkylene glycol containing from 2 through 12 carbon atoms, and an adduct of bisphenol with alkylene oxide (e.g., an adduct of bisphenol A with 2 moles of ethylene oxide and an adduct of bisphenol A with 3 moles of ethylene oxide). In order to adjust the molecular weight and molecular weight mobility, alkylene glycol (e.g., ethylene glycol, 1,2-propylene glycol, and 1,3-propylene glycol) may be used.

The content of the polyol in the isocyanate group-containing polyester prepolymer is not particularly limited, may be appropriately selected in accordance with the intended purpose, and is preferably, for example, 0.5% by mass or greater and 40% by mass or less, more preferably 1% by mass or greater and 30% by mass or less, and particularly preferably 2% by mass or greater and 20% by mass or less. When the content of the polyol is less than 0.5% by mass, hot offset resistance worsens, and it may be difficult for the toner to satisfy both of storage stability and low-temperature fixability. When the content of the polyol is greater than 40% by mass, low-temperature fixability may worsen.

The polycarboxylic acid is not particularly limited and may be appropriately selected in accordance with the intended purpose. Examples of the polycarboxylic acid include: alkylene dicarboxylic acid (e.g., succinic acid, adipic acid, and sebacic acid); alkenylene dicarboxylic acid (e.g., maleic acid and fumaric acid); aromatic dicarboxylic acid (e.g., terephthalic acid, isophthalic acid, and naphthalene dicarboxylic acid); and trivalent or greater polycarboxylic acid (e.g., aromatic polycarboxylic acid containing from 9 through 20 carbon atoms, such as trimellitic acid and pyromellitic acid). One of these polycarboxylic acids may be used alone or two or more of these polycarboxylic acids may be used in combination.

Among these polycarboxylic acids, alkenylene dicarboxylic acid containing from 4 through 20 carbon atoms and aromatic dicarboxylic acid containing from 8 through 20 carbon atoms are preferable as the polycarboxylic acid. Instead of the polycarboxylic acid, for example, a polycarboxylic anhydride or a lower alkyl ester (e.g., methyl ester, ethyl ester, and isopropyl ester) may be used.

The mixing ratio between the polyol and the polycarboxylic acid is not particularly limited and may be appropriately selected in accordance with the intended purpose. An equivalent ratio [OH]/[COOH] of the hydroxyl group [OH] of the polyol to the carboxyl group [COOH] of the polycarboxylic acid is preferably from 2/1 through 1/1, more preferably from 1.5/1 through 1/1, and particularly preferably from 1.3/1 through 1.02/1.

The polyisocyanate is not particularly limited and may be appropriately selected in accordance with the intended purpose. Examples of the polyisocyanate include: aliphatic polyisocyanate (e.g., tetramethylene diisocyanate, hexamethylene diisocyanate, 2,6-diisocyanatomethyl caproate, octamethylene diisocyanate, decamethylene diisocyanate, dodecamethylene diisocyanate, tetradecamethylene diisocyanate, trimethylhexane diisocyanate, and tetramethyl hexane diisocyanate); alicyclic polyisocyanate (e.g., isophorone diisocyanate and cyclohexylmethane diisocyanate); aromatic diisocyanate (e.g., tolylene diisocyanate, diphenylmethane diisocyanate, 1,5-naphthylene diisocyanate, diphenylene-4,4'-diisocyanate, 4,4'-diisocyanato-3,3'-dimethyl diphenyl, 3-methyl diphenylmethane-4,4'-diisocyanate, and diphenyl ether-4,4'-diisocyanate); aromatic aliphatic diisocyanate (e.g., α,α,α', α'-tetramethyl xylylene diisocyanate); isocyanurates (e.g., tris-isocyanatoalkyl-isocyanurate, and triisocyanatocycloalkyl-isocyanurate); phenol derivatives of these polyisocyanates, products blocked with, for example, oxime and caprolactam. One of these polyisocyanates may be used alone or two or more of these polyisocyanates may be used in combination.

The mixing ratio between the polyisocyanate and the active hydrogen group-containing polyester resin (hydroxyl group-containing polyester resin) is not particularly limited and may be appropriately selected in accordance with the intended purpose. An equivalent ratio [NCO]/[OH] of the isocyanate group [NCO] of the polyisocyanate to the hydroxyl group [OH] of the hydroxyl group-containing polyester resin is preferably from 5/1 through 1/1, more preferably from 4/1 through 1.2/1, and particularly preferably from 3/1 through 1.5/1. When the equivalent ratio [NCO]/[OH] is less than 1/1, offset resistance may worsen. When the equivalent ratio [NCO]/[OH] is greater than 5/1, low-temperature fixability may worsen.

The content of the polyisocyanate in the isocyanate group-containing polyester prepolymer is not particularly limited, may be selected in accordance with the intended purpose, and is preferably 0.5% by mass or greater and 40% by mass or less, more preferably 1% by mass or greater and 30% by mass or less, and particularly preferably 2% by mass or greater and 20% by mass or less. When the content of the polyisocyanate is less than 0.5% by mass, hot offset resistance worsens, and it may be difficult to satisfy both of storage stability and low-temperature fixability. When the content of the polyisocyanate is greater than 40% by mass, low-temperature fixability may worsen.

The average number of isocyanate groups contained per molecule of the isocyanate group-containing polyester prepolymer is preferably 1 or greater, more preferably from 1.2 through 5, and yet more preferably from 1.5 through 4. When the average number of isocyanate groups is less than 1, the molecular weight of the urea bond producing group-modified polyester resin (RMPE) is low, and hot offset resistance may worsen.

The mixing ratio between the isocyanate group-containing polyester prepolymer and the amines is not particularly limited and may be appropriately selected in accordance with the intended purpose. A mixing equivalent ratio [NCO]/[NHx] of the isocyanate group [NCO] in the isocyanate group-containing polyester prepolymer to the amino group [NHx] in the amines is preferably from 1/3 through 3/1, more preferably from ½ through 2/1, and particularly preferably from 1/1.5 through 1.5/1. When the mixing equivalent ratio ([NCO]/[NHx]) is less than ⅓, low-temperature fixability may decrease. When the mixing equivalent ratio ([NCO]/[NHx]) is greater than 3/1, the molecular weight of the urea-modified polyester resin is low, and hot offset resistance may worsen.

—Method for Synthesizing the Polymer Reactive with Active Hydrogen Group-Containing Compound—

The method for synthesizing the polymer reactive with the active hydrogen group-containing compound is not particularly limited and may be appropriately selected in accordance with the intended purpose. Examples of the method include, in a case of the isocyanate group-containing polyester prepolymer, a method of heating the polyol and the polycarboxylic acid to from 150° C. through 280° C. in the presence of a publicly-known esterification catalyst (e.g., titanium tetrabutoxide and dibutyl tin oxide), proceeding with production with appropriate decompression as needed, evaporating water to obtain hydroxyl group-containing polyester, and subsequently reacting the hydroxyl group-containing polyester with the polyisocyanate at from 40° C. through 140° C., to synthesize the polymer.

The weight average molecular weight (Mw) of the polymer reactive with the active hydrogen group-containing compound is not particularly limited and may be appropriately selected in accordance with the intended purpose. In a molecular weight distribution obtained by Gel Permeation Chromatography (GPC) of tetrahydrofuran (THF)-soluble components, the weight average molecular weight (Mw) of the polymer reactive with the active hydrogen group-containing compound is preferably from 3,000 through 40,000, and more preferably from 4,000 through 30,000. When the weight average molecular weight (Mw) is less than 3,000, storage stability may worsen. When the weight average molecular weight (Mw) is greater than 40,000, low-temperature fixability may worsen.

The weight average molecular weight (Mw) can be measured as follows, for example.

First, columns are stabilized in a heat chamber at 40° C., tetrahydrofuran (THF) serving as a column solvent is flowed at a flow rate of 1 mL/minute at the temperature, and a tetrahydrofuran sample solution of the resin adjusted to a sample concentration of from 0.05% by mass through 0.6% by mass is injected in an amount of from 50 μL through 200 μL and measured. For measuring the molecular weight of the sample, the molecular weight distribution of the sample is calculated from a relationship between counted numbers and logarithmic values on a calibration curve generated using some types of monodisperse polystyrene standard samples.

As the standard polystyrene samples for generation of the calibration curve, those having a molecular weight of 6×10, 2.1×102, 4×102, 1.75×104, 1.1×105, 3.9×105, 8.6×105, 2×106, and 4.48×106 available from Pressure Chemical Co. or Tosoh Corporation are used. It is preferable to use at least approximately ten standard polystyrene samples. As the detector, a Refractive Index (RI) detector may be used.

<<Release Agent>>

The release agent is not particularly limited and may be appropriately selected in accordance with the intended purpose. Examples of the release agent include: waxes such as vegetable-based waxes (e.g., carnauba wax, cotton wax, Japan wax, and rice wax), animal-based waxes (e.g., beeswax and lanolin), mineral-based waxes (e.g., ozocerite and ceresin), and petroleum waxes (e.g., paraffin, microcrystalline, and petrolatum); those other than natural waxes, such as synthetic hydrocarbon waxes (e.g., Fischer-Tropsch wax, and polyethylene wax) and synthetic waxes (e.g., ester, ketone, and ether); fatty acid amides such as 1,2-hydroxystearic acid amid, stearic acid amide, anhydrous phthalic acid imide, and chlorinated hydrocarbon; and crystalline polymers containing a long-chain alkyl group in a side chain, such as homopolymers or copolymers of polyacrylates such as n-stearyl polymethacrylate and n-lauryl polymethacrylate, which are low-molecular-weight crystalline polymers (examples of the copolymers include n-stearyl acrylate/ethyl methacrylate copolymers).

Among these release agents, Fischer-Tropsch wax, paraffin wax, microcrystalline wax, monoester wax, and rice wax are preferable because they produce less volatile organic compounds that are unnecessary during fixing.

A commercially available product may be used as the release agent. Examples of the commercially available product of the microcrystalline wax include "HI-MIC-1045", "HI-MIC-1070", "HI-MIC-1080", "HI-MIC-1090" available from Nippon Seiro Co., Ltd, "BESQUARE 180 WHITE" and "BESQUARE 195" available from Toyo ADL Corp., "BARECO C-1035" available from WAX Petrolife, and "CRAYVALLAC WN-1442" available from Cray Valley S. A.

The melting point of the release agent is not particularly limited, may be appropriately selected in accordance with the intended purpose, and is preferably from 60° C. through 100° C., and more preferably from 65° C. through 90° C. When the melting point of the release agent is 60° C. or higher, it is possible to inhibit occurrence of exuding of the release agent from the toner base even in a high-temperature storage at approximately from 30° C. through 50° C., and to maintain heat-resistant storage stability favorably. When the melting point of the release agent is 100° C. or lower, there is an advantage that cold offset is not likely to occur during low-temperature fixing.

The melting point is measured by DSC. For example, the melting point can be measured using TA-60WS and DSC-60 available from Shimadzu Corporation under the following measurement conditions.

(Measurement Conditions)

Sample container: a sample pan made of aluminum (with a lid)

Sample amount: 5 mg

Reference: a sample pan made of aluminum (10 mg of alumina)

Atmosphere: nitrogen (flow rate: 50 mL/min)

Temperature conditions

1st: temperature raising start temperature: 20° C., temperature raising rate: 10° C./min, and ending temperature: 150° C., retention time: absent 1st: temperature lowering rate: 10° C./min, ending temperature: 20° C., retention time: absent 2nd: temperature raising rate: 10° C./min, ending temperature: 150° C.

The result of measurement is analyzed using data analyzing software available from Shimadzu Corporation (TA-60, version 1.52).

As the melting point, the peak top temperature at the endothermic peak measured in the 2nd. temperature raising is adopted.

It is preferable that the release agent is present in a state of being dispersed in the toner base particles. To this end, it is preferable that the release agent and the binder resin are not compatible. The method for minutely dispersing the release agent in the toner base particles is not particularly limited and may be appropriately selected in accordance with the intended purpose. Examples of the method include a method of dispersing the release agent by applying a kneading shear force during toner production.

It is possible to confirm the dispersion state of the release agent by observing a thinly cut piece of a toner particle using a Transmission Electron Microscope (TEM). It is more preferable that the dispersion diameter of the release agent is smaller. However, if the dispersion diameter is excessively small, the release agent may not be able to exude sufficiently during fixing. Hence, success in confirming the release agent at a magnification of ×10,000 means that the release agent is present in a dispersed state. If the release agent cannot be confirmed at the magnification of ×10,000, exuding of the release agent during fixing will be insufficient even if the release agent is minutely dispersed.

The content of the release agent in the toner is not particularly limited, may be appropriately selected in accordance with the intended purpose, and is preferably 3% by mass or greater and 15% by mass or less and more preferably 5% by mass or greater and 10% by mass or less. When the content of the release agent is less than 3% by mass, hot offset resistance may worsen disadvantageously. When the content of the release agent is greater than 15% by mass, the release agent may exude excessively during fixing, and heat-resistant storage stability tends to worsen disadvantageously.

<<Other Components>>

—Colorant—

The colorant used in the toner is not particularly limited, and may be appropriately selected from publicly-known colorants in accordance with the intended purpose.

The color of the colorant of the toner may be at least one selected from yellow toners, and can be obtained by appropriately selecting the type of the colorant.

Examples of the coloring pigments for yellow include C.I. Pigment Yellow 1, 2, 3, 4, 5, 6, 7, 10, 11, 12, 13, 14, 15, 16, 17, 23, 55, 65, 73, 74, 83, 97, 110, 139, 151, 154, 155, 180, and 185; and C. I. bat yellow 1, 3, 20; and orange 36.

The content of the colorant in the toner is preferably 1% by mass or greater and 15% by mass or less and more preferably 3, by mass or greater and 10% by mass or less. When the content of the colorant is less than 1% by mass, the coloring power of the toner may decrease. When the content of the colorant is greater than 15, by mass, dispersion failure of the pigment in the toner occurs, which may bring about reduction in the coloring power, and reduction in the electric property of the toner.

The colorant may be used in the form of a masterbatch in which the colorant is combined with a resin. The resin is not particularly limited, yet it is preferable to use the binder resin or a resin having a structure similar to the binder resin in terms of compatibility with the binder resin.

It is possible to produce the masterbatch by mixing or kneading the resin and the colorant under a high shear force. Here, in order to increase the interaction between the colorant and the resin, it is preferable to add an organic solvent. Moreover, what is generally referred to as a flushing method is also preferable because a wet cake of the colorant can be used as is, and does not need to be dried.

The flushing method is a method of mixing or kneading a water-containing water-based paste of the colorant together with a resin and an organic solvent, transferring the colorant to the resin side, and removing water and the organic solvent. For mixing or kneading, for example, a high-shear dispersing device such as a three-roll mill may be used.

<Organically Modified Layered Inorganic Mineral>

The organically modified layered inorganic mineral is an organically modified layered inorganic mineral obtained from at least some ions existing between layers of a layered inorganic mineral being modified with organic substance ions. The layered inorganic mineral is an inorganic mineral having a layered shaped formed from layers having a thickness of some nanometers being overlaid on each other. Being "modified" is the same as organic substance ions being introduced to ions existing between layers of the layered inorganic mineral, and means intercalation in the broad sense of the term.

It has been found that the layered inorganic mineral exerts its maximum effect by being positioned near the surface, and tends to be positioned near the surface. It is preferable that the organically modified layered inorganic mineral according to the present disclosure is contained in the toner particles at a uniform proportion regardless of whether the particle diameter of the toner is large or small. Hence, the organically modified layered inorganic mineral will be uniformly positioned near the surface in all toner particles.

This has an effect of avoiding a phenomenon in which, for example, the content proportion of the organically modified layered inorganic mineral is low in a toner particle having a small particle diameter, the proportion of the organically modified layered inorganic mineral positioned near the surface is thusly low, and the surface of the toner particle is relatively soft and easily embedded with an external additive added on the toner base to inhibit detachment of the external additive that is advantageous for, for example, imparting flowability to the toner.

Here, it is possible to confirm the existing state of the organically modified layered inorganic mineral in the toner, by cutting a sample, which is obtained by embedding, for example, an epoxy resin with a toner particle, using a micro-microtome or an ultra-microtome, and observing the toner cross-section with, for example, a Scanning Electron Microscope (SEM). In a case of observation by the SEM, confirmation by a backscattered electron image is preferable, because the existence of the organically modified layered inorganic mineral can be observed at a strong contrast. Moreover, a sample obtained by embedding, for example, an epoxy resin with a toner particle may be cut by an ion beam using FIB-STEM (HD-2000, available from Hitachi, Ltd.), and a resulting toner cross-section may be observed. Also in this case, confirmation by a backscattered electron image is preferable because of ease of visual observation.

The location near the surface of the toner as mentioned in the present disclosure is defined as a region expanding from the outermost surface of the toner inward into the toner by from 0 nm through 300 nm in an observed image of a cross-section of the toner obtained by cutting a sample, which is obtained by embedding, for example, an epoxy resin with a toner particle, using a micro-microtome or an ultra-microtome, or FIB-STEM.

The layered inorganic mineral is not particularly limited and may be appropriately selected in accordance with the intended purpose. Examples of the layered inorganic mineral include smectite group clay minerals (e.g., montmorillonite, saponite, and hectorite), kaolin group clay mineral (e.g., kaolinite), bentonite, attapulgite, magadiite, and kanemite. One of these layered inorganic minerals may be used alone or two or more of these layered inorganic minerals may be used in combination.

The organically modified layered inorganic mineral is not particularly limited and may be appropriately selected in accordance with the intended purpose. Examples include organically modified layered inorganic minerals obtained from at least some ions existing between layers of the layered inorganic minerals being modified with organic substance ions. Among these organically modified layered inorganic minerals, those obtained from at least some ions between layers of smectite group clay minerals having a smectite-based basic crystal structure being modified with organic cations are preferable in terms of dispersion stability near the surface of the toner, and those obtained from at least some ions between layers of montmorillonite being modified with organic cations and those obtained from at least some ions between layers of bentonite being modified with organic cations are particularly preferable.

It can be confirmed by Gas Chromatograph Mass Spectrometry (GCMS) that the organically modified layered inorganic mineral is a product obtained from at least some ions existing between layers of the layered inorganic mineral being modified with organic substance ions. For example, a preferable method is to filtrate a solution obtained by dissolving the binder resin contained in the sample toner in a solvent, pyrolyze the obtained solid using a pyrolysis device, and identify the structure of the organic substance by GCMS. A specific method is to perform pyrolysis at 550° C. using Py-2020D (available from Frontier Laboratories Ltd.) as the pyrolysis device, and subsequently identify the resulting product using a GCMS device QP5000 (available from Shimadzu Corporation).

Examples of the organically modified layered inorganic mineral include a layered inorganic compound obtained by introducing metal anions into the layered inorganic mineral by replacing a divalent metal of the layered inorganic mineral partially with a trivalent metal, and further modifying at least some of the metal anions with organic anions.

A commercially available product may be used as the organically modified layered inorganic mineral. Examples of the commercially available product include: quaternium-18 bentonite such as BENTONE 3, BENTONE 38, and BENTONE 38V (all available from Rheox Corporation), TIXOGEL VP (available from United Catalysts Inc.), and CLAYTONE 34, CLAYTONE 40, and CLAYTONE XL (all available from Southern Clay Products, $I_{nc}$.); stearalkonium bentonite such as BENTONE 27 (available from Rheox Corporation), TIXOGEL LG (available from United Catalysts Inc.), and CLAYTONE AF, and CLAYTONE APA (both available from Southern Clay Products, Inc.); quaternium-18/benzalkonium bentonite such as CLAYTONE HT and CLAYTONE PS (both available from Southern Clay Products, Inc.); organically modified montmorillonite such as CLAYTONE HY (available from Southern Clay Products, Inc.); and organically modified smectite such as LUCENTITE SPN (available from Corp Chemical Co., Ltd.). Among these commercially available products, CLAYTONE AF and CLAYTONE APA are particularly preferable.

As the organically modified layered inorganic mineral, DHT-4A (available from Kyowa Chemical Industry Co., Ltd.) modified with a compound containing the organic substance ions and represented by $R_1(OR_2)_nOSO_3M$ (where $R_1$ represents an alkyl group containing 13 carbon atoms, $R_2$ represents an alkylene group containing from 2 through 6 carbon atoms, n represents an integer of from 2 through 10, and M represents a monovalent metal element) is particularly preferable. Examples of the compound containing the organic substance ions and represented by $R_1(OR_2)_nOSO_3M$ include HITENOL 330T (available from DKS Co. Ltd.).

The organically modified layered inorganic mineral may be used in the form of a masterbatch in which it is mixed and combined with a resin. The resin is not particularly limited and may be appropriately selected from publicly-known resins in accordance with the intended purpose.

The content of the organically modified layered inorganic mineral in the toner is preferably 0.1% by mass or greater and 3.0, by mass or less and particularly preferably 0.3% by mass or greater and 1.5% by mass or less. When the content of the organically modified layered inorganic mineral is less than 0.1% by mass, it becomes difficult for the layered inorganic mineral to exert its effect. When the content of the organically modified layered inorganic mineral is greater than 3.0%, by mass, low-temperature fixability tends to be inhibited.

An organic substance ion modifying agent, which is a compound that contains the organic substance ions and can modify at least some ions existing between layers of the layered inorganic mineral with the organic substance ions is not particularly limited and may be appropriately selected in accordance with the intended purpose. Examples of the organic substance ion modifying agent include: quaternary alkyl ammonium salts, phosphonium salts, and imidazolium salts; and sulfates having such a skeleton as a branched, unbranched, or cyclic alkyl containing from 1 through 44 carbon atoms, a branched, unbranched, or cyclic alkenyl containing from 1 through 22 carbon atoms, a branched, unbranched, or cyclic alkoxy containing from 8 through 32 carbon atoms, a branched, unbranched, or cyclic hydroxyalkyl containing from 2 through 22 carbon atoms, ethylene oxide, and propylene oxide, sulfonates having the skeleton, carboxylates having the skeleton, and phosphates having the skeleton. Among these organic substance ion modifying agents, quaternary alkyl ammonium salts and carboxylic acid having an ethylene oxide skeleton are preferable, and quaternary alkyl ammonium salts are particularly preferable. One of these organic substance ion modifying agents may be used alone or two or more of these organic substance ion modifying agents may be used in combination.

Examples of the quaternary alkyl ammonium include trimethyl stearyl ammonium, dimethyl stearyl benzyl ammonium, dimethyl octadecyl ammonium, and oleyl bis (2-hydroxyethyl)methyl ammonium.

—Charge Controlling Agent—

A charge controlling agent may be contained in the toner as needed, in order to impart an appropriate chargeability to the toner.

As the charge controlling agent, any publicly-known charge controlling agent may be used. A colored material may change the color tone. Hence, a colorless material or a material close to white is preferable. Examples of the material include triphenylmethane-based dyes, molybdic acid chelate pigments, rhodamine-based dyes, alkoxy-based amines, quaternary ammonium salts (including fluorine-modified quaternary ammonium salts), alkyl amides, phosphorus or phosphorus compounds, tungsten or tungsten compounds, fluorine-based active agents, metals salts of salicylic acid, and metal salts of salicylic acid derivatives. One of these materials may be used alone or two or more of these materials may be used in combination.

The content of the charge controlling agent is determined based on the type of the binder resin and the toner production method including the dispersion method, and cannot be limited unambiguously. Yet, the content of the charge controlling agent is preferably from 0.01% by mass through 5% by mass and more preferably 0.02% by mass or greater and 2% by mass or less relative to the binder resin. When the adding amount of the charge controlling agent is greater than 5% by mass, chargeability of the toner is excessively high and the effect of the charge controlling agent is reduced, thereby increasing the electrostatic attractive force of the toner with respect to a developing roller, and incurring reduction in the flowability of the developer and reduction in the image density. When the adding amount of the charge controlling agent is less than 0.01% by mass, the charge rising property and the charging amount may not be sufficient, which may affect a toner image.

<<External Additive>>

The external additive is not particularly limited and may be appropriately selected from publicly-known external additives in accordance with the intended purpose. Examples of the external additive include: silica particles, hydrophobized silica particles, and fatty acid metal salts (e.g., zinc stearate and aluminum stearate); and metal oxides (e.g., titania, alumina, tin oxide, and antimony oxide) or hydrophobized products of the metal oxides, and fluoropolymers. Among these external additives, hydrophobized silica particles, titania particles, and hydrophobized titania particles are preferable.

Examples of the hydrophobized silica particles include: HDK H2000T, HDK H2000/4, HDK H2050EP, HVK21, and HDK H1303VP (all available from Clariant Japan K.K.); and R972, R974, RX200, RY200, R202, R805, R812, and NX90G (all available from Nippon Aerosil Co., Ltd.).

Examples of the titania particles include: P-25 (available from Nippon Aerosil Co., Ltd.); STT-30 and STT-65C-S (both available from Titan Kogyo, Ltd.); TAF-140 (available from Fuji Titanium Industry Co., Ltd.); and MT-150W, MT-500B, MT-600B, and MT-150A (all available from Tayca Corporation).

Examples of the hydrophobized titanium oxide particles include: T-805 (available from Nippon Aerosil Co., Ltd.); STT-30A and STT-65S-S (both available from Titan Kogyo, Ltd.); TAF-500T and TAF-1500T (both available from Fuji Titanium Industry Co., Ltd.); MT-100S and MT-100T (both available from Tayca Corporation); and IT-S (available from Ishihara Sangyo Kaisha, Ltd.).

The content of the external additive is not particularly limited, may be appropriately selected in accordance with the intended purpose, yet is preferably from 0.3 parts through 3.0 parts and more preferably from 0.5 parts through 2.0 parts relative to 100 parts of the toner base particles.

The total coverage of the external additive on the toner base particles is not particularly limited, yet is preferably 50% or higher and 90% or lower and more preferably 60% or higher and 80% or lower.

<Toner Production Method>

The production method and materials of the toner according to the present disclosure are not particularly limited, and all publicly-known methods and materials may be used so long as they satisfy conditions. Examples of the method include a kneading pulverizing method, and what is generally referred to as a chemical method, which granulates toner particles in a water-based medium.

Examples of the chemical method include: a suspension polymerization method, an emulsion polymerization method, a seed polymerization method, and a dispersion polymerization method, which produce a toner using a monomer as a starting raw material: a dissolution suspension method of dissolving a resin or a resin precursor in, for example, an organic solvent, and dispersing or emulsifying it in a water-based medium; a method (ester elongation method) of, as the dissolution suspension method, emulsifying or dispersing an oil-phase composition, which contains a resin precursor (reactive group-containing prepolymer) containing a functional group reactive with an active hydrogen group, in a water-based medium containing resin particles, and reacting an active hydrogen group-containing compound with the reactive group-containing prepolymer in the water-based medium; a phase-inversion emulsification method of inverting the phase of a solution made of a resin or a resin precursor and a suitable emulsifier by adding water; and a flocculation method of flocculating resin particles, which are obtained by these methods, while they are in a state of being dispersed in a water-based medium, and granulating them to particles having a desired size by, for example, heating and melting. Toners obtained by the dissolution suspension method, the ester elongation method, and the flocculation method, among these methods, are preferable in terms of granularity (e.g., granularity distribution control and particle shape control), and a toner obtained by the ester elongation method is more preferable.

These methods will be described below in detail.

The kneading pulverizing method is a method of pulverizing and classifying, for example, a melted kneaded product of toner materials including at least a colorant, a binder resin, and a release agent, to produce base particles of the toner.

In the melting and kneading, the toner materials are mixed, and the mixture is fed into a melting kneader to be melted and kneaded. As the melting kneader, for example, a uniaxial or biaxial continuous kneader, and a batch-type kneader using a roll mill may be used. For example, it is preferable to use a KTT-type biaxial extruder available from Kobe Steel, Ltd., a TEM-type extruder available from Shibaura Machine Co., Ltd., a biaxial extruder available from KCK Engineering Co., Ltd., a PCM-type biaxial extruder available from Ikegai Co., Ltd., and a co-kneader available from Buss AG. It is preferable to perform the melting and kneading under appropriate conditions that do not incur cutting of molecular chains of the binder resin. Specifically, the melting kneading temperature is set in consideration of the softening point of the binder resin. Severe cutting occurs at a temperature extremely higher than the softening point, and dispersion may not progress at a temperature extremely lower than the softening point.

In the pulverization, the kneaded product obtained by the kneading is pulverized. In the pulverization, it is preferable to coarsely pulverize the kneaded product first, and then minutely pulverize the kneaded product next. Here, it is preferable to use a method of pulverizing the kneaded product by making it collide with a collision board in a jet airflow, a method of pulverizing the kneaded product by making the particles collide with each other in a jet airflow, and a method of pulverizing the kneaded product in a narrow gap between a mechanically rotating rotor and a stator.

In the classification, the pulverized product obtained by the pulverization is classified and adjusted to particles having a predetermined particle diameter. It is possible to perform the classification by removing a minute particle fraction using, for example, a cyclone, a decanter, and a centrifuge.

After the pulverization and the classification are completed, the pulverized product is classified in an airflow under, for example, a centrifugal force. In this way, toner base particles having a predetermined particle diameter can be produced.

The dissolution suspension method is a method of, for example, dispersing or emulsifying in a water-based medium, an oil-phase composition obtained by dissolving or dispersing a toner composition containing at least a binder resin or a resin precursor, a colorant, and a release agent in an organic solvent, to produce toner base particles.

It is preferable that the organic solvent used for dissolving or dispersing the toner composition has a boiling point lower than 100° C. and is volatile, because it is easy to remove the solvent afterwards.

Examples of the organic solvent include ester-based, or ester ether-based solvents such as ethyl acetate, butyl acetate, methoxy butyl acetate, methyl cellosolve acetate, and ethyl cellosolve acetate, ether-based solvents such as diethyl ether, tetrahydrofuran, dioxane, ethyl cellosolve, butyl cellosolve, and propylene glycol monomethyl ether, ketone-based solvents such as acetone, methyl ethyl ketone, methyl isobutyl ketone, di-n-butyl ketone, and cyclohexanone, alcohol-based solvents such as methanol, ethanol, n-propanol, isopropanol, n-butanol, isobutanol, t-butanol, 2-ethylhexyl alcohol, and benzyl alcohol, and mixture solvents of two or more of these solvents.

In the dissolution suspension method, an emulsifier or a dispersant may be used as needed when dispersing or emulsifying the oil-phase composition in the water-based medium.

As the emulsifier or the dispersant, for example, publicly-known surfactants and water-soluble polymers may be used. The surfactant is not particularly limited, and examples of the surfactant include anionic surfactants (e.g., alkyl benzene sulfonic acid, and phosphoric acid ester), cationic surfactants (e.g., quaternary ammonium salt types and amine salt types), amphoteric surfactants (e.g., carboxylic acid salt types, sulfuric acid ester salt types, sulfonic acid salt types, and phosphoric acid ester salt types), and nonionic surfactants (e.g., AO adduct types and multivalent alcohol types). As the surfactant, one surfactant may be used alone or two or more surfactants may be used in combination.

Examples of the water-soluble polymer include cellulose-based compounds (e.g., methyl cellulose, ethyl cellulose, hydroxyethyl cellulose, ethyl hydroxyethyl cellulose, carboxymethyl cellulose, hydroxypropyl cellulose, and saponified products of these), gelatin, starch, dextrin, gum Arabic, chitin, chitosan, polyvinyl alcohol, polyvinyl pyrrolidone, polyethylene glycol, polyethylene imine, polyacrylamide, acrylic acid (salt)-containing polymers (e.g., sodium polyacrylate, potassium polyacrylate, ammonium polyacrylate, a partially neutralized product of a polyacrylic acid with sodium hydroxide, and a sodium acrylate/acrylic acid ester copolymer), a (partially) neutralized product of a styrene/maleic anhydride copolymer with sodium hydroxide, and water-soluble polyurethane (e.g., reaction products of, for example, polyethylene glycol or polycaprolactone diol with a polyisocyanate). Moreover, as an aid for emulsification or dispersion, for example, any organic solvent specified above and a plasticizer may be used in combination.

It is preferable to obtain the toner according to the present disclosure, by granulating base particles of the toner by dispersing or emulsifying in a water-based medium containing resin particles, an oil-phase composition containing at least a binder resin, a binder resin precursor (reactive group-containing prepolymer) containing a functional group reactive with an active hydrogen group, a colorant, and a release agent, and reacting an active hydrogen group-containing compound contained in either or both of the oil-phase composition and the water-based medium with the reactive group-containing prepolymer (ester elongation method) in the dissolution suspension method.

The resin particles can be formed by a publicly-known polymerization method. It is preferable to obtain the resin particles in the form of a water-based dispersion liquid of the resin particles. Examples of the method for preparing the water-based dispersion liquid of the resin particles include the following methods (a) to (h).

(a) A method of preparing the water-based dispersion liquid of the resin particles directly from a vinyl monomer starting raw material, by any polymerization reaction selected from a suspension polymerization method, an emulsion polymerization method, a seed polymerization method, and dispersion polymerization method.

(b) A method of preparing the water-based dispersion liquid of the resin particles by dispersing a precursor (e.g., a monomer and an oligomer) of a polyaddition or condensation-based resin such as a polyester resin, a polyurethane resin, and an epoxy resin or a solvent solution of the precursor in a water-based medium in the presence of a suitable dispersant, and subsequently curing the precursor or the solution of the precursor by heating or by adding a curing agent.

(c) A method of preparing the water-based dispersion liquid of the resin particles by dissolving a suitable emulsifier in a precursor (e.g., a monomer and an oligomer) of a polyaddition or condensation-based resin such as a polyester resin, a polyurethane resin, and an epoxy resin or a solvent solution of the precursor (a liquid form of the precursor is preferable, and the precursor may be liquefied by heating), and subsequently adding water to induce phase-inversion emulsification.

(d) A method of preparing the water-based dispersion liquid of the resin particles by pulverizing a resin that is previously synthesized through a polymerization reaction (e.g., addition polymerization, ring-opening polymerization, polyaddition, addition condensation, and condensation polymerization) by using a minute pulverizer of, for example, a mechanical rotation-type or a jet-type, classifying the resulting product to obtain resin particles, and subsequently dispersing the resin particles in water in the presence of a suitable dispersant.

(e) A method of preparing the water-based dispersion liquid of the resin particles by spraying in a mist form, a resin solution obtained by dissolving a resin that is previously synthesized through a polymerization reaction (e.g., addition polymerization, ring-opening polymerization, polyaddition, addition condensation, and condensation polymerization) in a solvent, to form resin particles, and subsequently dispersing the resin particles in water in the presence of a suitable dispersant.

(f) A method of preparing the water-based dispersion liquid of the resin particles by (1) precipitating resin particles by: (i) adding a poor solvent into a resin solution obtained by dissolving a resin that is previously synthesized through a polymerization reaction (e.g., addition polymerization, ring-opening polymerization, polyaddition, addition condensation, and condensation polymerization) in a solvent; or (ii) cooling a resin solution obtained by previously dissolving the resin in a solvent by heating, (2) removing the solvent(s) to form resin particles, and (3) subsequently dispersing the resin particles in water in the presence of a suitable dispersant.

(g) A method of preparing the water-based dispersion liquid of the resin particles by dispersing in a water-based medium in the presence of a suitable dispersant, a resin solution obtained by dissolving a resin that is previously synthesized through a polymerization reaction (e.g., addition polymerization, ring-opening polymerization, polyaddition, addition condensation, and condensation polymerization) in a solvent, and subsequently removing the solvent by, for example, heating or decompression.

(h) A method of preparing the water-based dispersion liquid of the resin particles by dissolving a suitable emulsifier in a resin solution obtained by dissolving a resin that is previously synthesized through a polymerization reaction (e.g., addition polymerization, ring-opening polymerization, polyaddition, addition condensation, and condensation polymerization) in a solvent, and subsequently adding water to induce phase-inversion emulsification.

The volume average particle diameter of the resin particles is preferably 10 nm or greater and 300 nm or less and more preferably 30 nm or greater and 120 nm or less. When the volume average particle diameter of the resin particle is less than 10 nm, and greater than 300 nm, there is a disadvantage that the granularity distribution of the toner may worsen.

The concentration of solids in the oil phase is preferably 40% or higher and 80% or lower. When the concentration of solids is excessively high, the solids do not readily dissolve or disperse, or increase the viscosity to make the oil phase difficult to handle. When the concentration of solids is excessively low, toner producibility decreases.

The toner components other than the binder resin, such as, for example, the colorant and the release agent, and the organically modified layered inorganic mineral, and, for example, masterbatches of these may be mixed with a solution or a dispersion liquid of the binder resin after they are individually dissolved or dispersed in organic solvents.

As the water-based medium, water may be used alone, yet a solvent miscible with water may be used in combination. Examples of the miscible solvent include alcohols (e.g., methanol, isopropanol, and ethylene glycol), dimethyl formamide, tetrahydrofuran, cellosolves (e.g., methyl cellosolve), and lower ketones (e.g., acetone and methyl ethyl ketone).

The method for dispersion or emulsification in the water-based medium is not particularly limited. Yet, publicly-known instruments such as a low-speed shearing type, a high-speed shearing type, a friction type, a high-pressure jet type, and an ultrasonic type may be used. Among these instruments, a high-speed shearing type is preferable in terms of making the particle diameter small. When using a high-speed shearing-type dispersion device, the rotation rate is not particularly limited, yet is typically from 1,000 rpm through 30,000 rpm, and preferably from 5,000 rpm through 20,000 rpm. The temperature during dispersion is typically from 0° C. through 150° C. (under pressurization), and preferably from 20° C. through 80° C.

When a high-speed shearing type is used for dispersion or emulsification in the water-based medium, small oil droplets are also produced. Through a re-aggregation process of these small oil droplets, variations in the particle diameter and the raw material positioning are likely to occur.

Hence, for example, by applying a weak shear force again after granulation, it is possible to control the re-aggregation process and product particles with a uniform particle diameter and with a uniform raw material positioning.

The method for applying the shear force is not particularly limited. When using, for example, a low-speed shearing type, the rotation rate is not particularly limited, yet is typically from 1,000 rpm through 8,000 rpm, and preferably from 1,000 rpm through 3,000 rpm. It is particularly important to apply a suitable energy. A high shear energy may inhibit re-aggregation in some cases.

Waiting time from when high-speed shearing is performed until before low-speed shearing is performed may also affect granulation. The waiting time is not particularly limited because each production line of the toner has its own optimal time, yet it is preferable to perform low-speed shearing after a waiting time of, for example, from 5 seconds through 120 seconds and preferably from 5 seconds through 30 seconds has passed.

In order to remove the organic solvent from the obtained emulsified dispersion, any particularly non-limited publicly-known method may be used. For example, it is possible to employ a method of gradually raising the temperature of the system while stirring the entire system at normal pressure or a reduced pressure, to completely evaporate and remove the organic solvent contained in the liquid droplets.

As a method for washing and drying the base particles of the toner dispersed in the water-based medium, a publicly-known technique is used. That is, after solid-liquid separation of the base particles of the toner dispersed in the water-based medium using, for example, a centrifuge and a filter press, an obtained toner cake is re-dispersed in ion-exchanged water at from normal temperature through approximately 40° C., and then again subjected to solid-liquid separation after, as needed, pH adjustment with an acid or an alkali. This step is repeated a few times to remove, for example, impurities and any surfactant, and the remaining product is subsequently dried using, for example, a flash dryer, a circulation dryer, a vacuum dryer, and a vibrating fluidized bed dryer, to obtain a toner powder. Here, minute particle components of the toner may be removed by, for example, centrifugation, or a publicly-known classifier may be used after the drying as needed, for adjustment to a desired particle diameter distribution.

The flocculation method is, a method of, for example, mixing a resin particle dispersion liquid made of at least a binder resin, a colorant particle dispersion liquid, and as needed, a release agent particle dispersion liquid, and flocculating the particles, to produce toner base particles. The resin particle dispersion liquid is obtained by a publicly-known method such as emulsion polymerization, seed polymerization, and phase-inversion polymerization. The colorant particle dispersion liquid and the release agent particle dispersion liquid are obtained by dispersing a colorant and a release agent in water-based media by, for example, a publicly-known wet dispersion method.

To control a flocculation state, it is preferable to use such a method as applying heat, adding a metal salt, or adjusting pH.

The metal salt is not particularly limited. Examples include: salt-forming monovalent metals such as sodium and potassium; salt-forming divalent metals such as calcium and magnesium; and salt-forming trivalent metals such as aluminum.

Examples of anions that form the salt include chloride ions, bromide ions, iodide ions, carbonate ions, and sulfate ions. Among these salts, magnesium chloride, aluminum chloride, and their complexes and multimeric complexes are preferable.

By applying heat during flocculation or after flocculation is completed, it is possible to promote mutual fusing of the resin particles. This is preferable in terms of toner uniformity. Moreover, by applying heat, it is possible to control the toner shape. More heat application makes the toner closer to a spherical shape.

As a method for washing and drying the toner base particles dispersed in a water-based medium, for example, the method described above may be used.

In order to increase flowability, storage stability, developability, and transferability of the toner, inorganic particles such as hydrophobic silica minute powder may further be added and mixed with the toner base particles produced as described above.

A common powder mixer is used for mixing the additives. It is preferable to be able to adjust the internal temperature by equipping the mixer with, for example, a jacket. In order to change the history of the load applied to the additives, the additives may be added halfway in the process or gradually. In this case, for example, rotation rate, rolling motion speed, time, and temperature of the mixer may be changed. Alternatively, a strong load may be applied first, and a relatively weak load may be applied next, or vice versa. Examples of the mixing instrument that can be used include a V-type mixer, a rocking mixer, a Loedige mixer, a Nauta mixer, and a Henschel mixer. Next, coarse particles and aggregated particles are removed through a sieve having a mesh size of 250 or greater, to obtain the toner.

(Developer)

A developer according to the present disclosure contains at least the toner, and contains appropriately selected other components such as a carrier. The developer may be a one-component developer or a two-component developer. For use in, for example, a high-speed printer that accommodates the recent years' improvement in the information processing speed, the two-component developer is preferable in terms of, for example, lifetime improvement.

In the case of the one-component developer using the toner, toner aggregates tend not to be generated over time even under, for example, stress applied by a developing device, a developing roller serving as a developer bearing member is not filmed with the toner, a layer thickness regulating member such as a blade configured to regulate the toner to a thin layer is not fused with the toner, and image density stability and transferability are maintained favorably. Hence, it is possible to obtain good and stable image qualities. In the case of the two-component developer using the toner, toner aggregates tend not to be generated over time even under, for example, stress applied by a developing device, occurrence of abnormal images is inhibited, and image density stability and transferability are maintained favorably. Hence, it is possible to obtain good and stable image qualities.

<Carrier>

The carrier is not particularly limited and may be appropriately selected in accordance with the intended purpose. A carrier containing core particles and resin layers (coating layers) coating the core particles is preferable.

<<Core particles>>

The core particles are not particularly limited and may be appropriately selected in accordance with the intended purpose so long as they are core particles having a magnetic property. Examples of the core particles include: ferromagnetic metals such as iron and cobalt; iron oxides such as magnetite, hematite, and ferrite; and resin particles obtained by dispersing magnetic bodies such as various alloys and compounds in resins. Among these core particles, for example, Mn-based ferrite, Mn—Mg-based ferrite, and Mn—Mg—Sr-based ferrite are preferable in terms of environmental concern.

—Weight Average Particle Diameter Dw of Core Particles—

The weight average particle diameter Dw of the core particles means the particle diameter at a cumulative weight percentage of 50% in the granularity distribution of the core particles obtained by laser diffractometry or a scattering method. The weight average particle diameter Dw of the core particles is not particularly limited, may be appropriately selected in accordance with the intended purpose, yet is preferably 10 μm or greater and 80 μm or less and more preferably 20 μm or greater and 65 μm or less.

For measuring the weight average particle diameter Dw of the core particles, a number-base particle diameter distribution (a relationship between number frequency and particle diameter) of the particles is measured using a MICROTRAC granularity analyzer (HRA9320-X100, available from Honeywell Inc.) under the conditions described below, and the weight average particle diameter Dw is calculated according to a formula (I) below. Each channel represents the length of the measurement width unit by which the particle diameter range of the particle diameter distribution graph is divided. As the representative particle diameter, the lower limit value among the particle diameters of the particles stored in each channel is adopted.

$$Dw = \{1/\sum(nD3)\} \times \{\sum(nD4)\} \quad \text{(I)}$$

In the formula (I), D represents the representative particle diameter (μm) of the core particles existing in each channel, and n represents the total number of core particles existing in each channel.

[Measurement Conditions]

[1] Particle diameter range: from 100 μm through 8 μm

[2] Channel length (channel width): 2 μm

[3] Number of channels: 46

[4] Refractive index: 2.42

<<Coating Layer>>

The coating layer contains at least a resin and may contain other components such as a filler as needed.

—Resin—

The resin that forms the coating layer of the carrier is not particularly limited and may be appropriately selected in accordance with the intended purpose. Examples of the resin include: cross-linking copolymers containing, for example, polyolefins (e.g., polyethylene and polypropylene) and modified products thereof, polystyrene, acrylic resins acrylonitrile, vinyl acetate, vinyl alcohol, vinyl chloride, vinyl carbazole, and vinyl ether; silicone resins formed by organosiloxane bonding or modified products thereof (e.g., products modified with, for example, alkyd resins, polyester resins, epoxy resins, polyurethane, and polyimide); polyamide; polyester; polyurethane; polycarbonate; urea resins;

melamine resins; benzoguanamine resins; epoxy resins; ionomer resins; polyimide resins; and derivatives of these. One of these resins may be used alone or two or more of these resins may be used in combination. Among these resins, silicone resins are preferable.

The silicone resins are not particularly limited and may be appropriately selected from commonly known silicone resins in accordance with the intended purpose. Examples of the silicone resins include straight silicone resins formed only by organosiloxane bonding, and silicone resins modified with, for example, alkyd, polyester, epoxy, acrylic, and urethane.

Examples of the straight silicone resins include KR271, KR272, KR282, KR252, KR255, and KR152 (available from Shin-Etsu Chemical Co., Ltd.), and SR2400, SR2405, and SR2406 (available from Dow Corning Toray Silicone Co., Ltd.).

Specific examples of the modified silicone resins include an epoxy-modified product: ES-1001N, acrylic-modified silicone: KR-5208, a polyester-modified product: KR-5203, an alkyd-modified product: KR-206, and a urethane-modified product: KR-305 (all available from Shin-Etsu Chemical Co., Ltd.), and an epoxy-modified product: SR2115 and an alkyd-modified product: SR2110 (available from Dow Corning Toray Silicone Co., Ltd.).

The silicone resin may be used alone, yet may be used together with, for example, a cross-linking reactive component and a charging amount adjusting component. Examples of the cross-linking reactive component include a silane coupling agent. Examples of the silane coupling agent include methyl trimethoxysilane, methyl triethoxysilane, octyl trimethoxysilane, and an amino silane coupling agent.

—Filler—

The filler is not particularly limited and may be appropriately selected in accordance with the intended purpose. Examples of the filler include conductive fillers and nonconductive fillers. One of these fillers may be used alone or two or more of these fillers may be used in combination. Among these fillers, it is preferable that the coating layer contains a conductive filler and a nonconductive filler.

The conductive filler means a filler having a powder specific resistance value of 100 Ω·cm or lower.

The nonconductive filler means a filler having a powder specific resistance value greater than 100 Ω·cm.

The powder specific resistance value of the filler can be measured using a powder resistance measurement system (MCP-PD51, available from Dia Instruments Co., Ltd.) and a resistivity meter (a four-terminal four-probe system, LORESTA GP, available from Nittoseiko Analytech Co., Ltd.) with a sample amount of 1.0 g, and at an electrode interval of 3 mm, a sample radius of 10.0 mm, and a load of 20 kN.

—Conductive Filler—

The conductive filler is not particularly limited and may be appropriately selected in accordance with the intended purpose. Examples of the conductive filler include conductive fillers formed as a tin dioxide layer or an indium oxide layer on a base made of, for example, aluminum oxide, titanium oxide, zinc oxide, barium sulfate, silicon oxide, and zirconium oxide; and conductive fillers formed using carbon black. Among these conductive fillers, conductive fillers containing aluminum oxide, titanium oxide, and barium sulfate are preferable.

—Nonconductive Filler—

The nonconductive filler is not particularly limited and may be appropriately selected in accordance with the intended purpose. Examples of the nonconductive filler include nonconductive fillers formed using, for example, aluminum oxide, titanium oxide, barium sulfate, zinc oxide, silicon dioxide, and zirconium oxide. Among these nonconductive fillers, nonconductive fillers containing aluminum oxide, titanium oxide, and barium sulfate are preferable.

<Carrier Production Method>

The method for producing the carrier is not particularly limited and may be appropriately selected in accordance with the intended purpose. A method of producing the carrier by applying a coating layer forming solution containing the resin and the filler on the surface of the core particles, using a fluidized bed coater is preferable. When applying the coating layer forming solution, the resin contained in the coating layer may be condensed. Alternatively, after the coating layer forming solution is applied, the resin contained in the coating layer may be condensed.

The method for condensing the resin is not particularly limited and may be appropriately selected in accordance with the intended purpose. Examples of the method include a method of applying, for example, heat and light to the coating layer forming solution and condensing the resin.

—Weight Average Particle Diameter Dw of Carrier—

The weight average particle diameter Dw of the carrier means the particle diameter at a cumulative weight percentage of 50% in the granularity distribution of the carrier obtained by laser diffractometry or a scattering method. The weight average particle diameter Dw of the carrier is not particularly limited, may be appropriately selected in accordance with the intended purpose, and is preferably 10 μm or greater and 80 μm or less and more preferably 20 μm or greater and 65 μm or less.

For measuring the weight average particle diameter Dw of the carrier, a number-base particle diameter distribution (a relationship between number frequency and particle diameter) of the particles is measured using a MICROTRAC granularity analyzer (HRA9320-X100, available from Honeywell Inc.) under the conditions described below, and the weight average particle diameter Dw is calculated according to a formula (II) below. Each channel represents the length of the measurement width unit by which the particle diameter range of the particle diameter distribution graph is divided. As the representative particle diameter, the lower limit value among the particle diameters of the particles stored in each channel is adopted.

$$Dw=\{1/\Sigma(nD3)\}\times\{i(nD4)\} \quad (II)$$

In the formula (II), D represents the representative particle diameter (μm) of the carrier particles existing in each channel, and n represents the total number of carrier particles existing in each channel.

[Measurement Conditions]

[1] Particle diameter range: from 100 μm through 8 μm
[2] Channel length (channel width): 2 μm
[3] Number of channels: 46
[4] Refractive index: 2.42

When the developer is a two-component developer, the mixing ratio between the toner and the carrier in the two-component developer, expressed as a mass ratio of the toner to the carrier, is preferably 2.0% by mass or greater and 12.0% by mass or less and more preferably 2.5% by mass or greater and 10.0% by mass or less.

(Process Cartridge)

A process cartridge according to the present disclosure is a process cartridge that includes at least an electrostatic latent image bearer, and a developing member configured to develop an electrostatic latent image formed on the electrostatic latent image bearer with a developer to form a visible image, and is detachably attachable on an image forming apparatus body. The developer is the toner or the developer according to the present disclosure. For example, the developing member will be described in detail below.

(Image Forming Method and Image Forming Apparatus)

An image forming method according to the present invention includes an electrostatic latent image forming step of forming an electrostatic latent image on an electrostatic latent image bearer, a developing step of developing the electrostatic latent image with the toner or the developer according to the present disclosure to form a visible image, a transfer step of transferring the visible image onto a recording medium, and a fixing step of fixing a transferred image transferred onto the recording medium thereon. The image forming method further includes, as needed, appropriately selected other steps such as a charge eliminating step, a cleaning step, a recycling step, and a control step.

An image forming apparatus according to the present disclosure includes an electrostatic latent image bearer, an electrostatic latent image forming member configured to form an electrostatic latent image on the electrostatic latent image bearer, a developing member configured to develop the electrostatic latent image with the toner or the developer according to the present disclosure to form a visible image, a transfer member configured to transfer the visible image onto a recording medium, and a fixing member configured to fix a transferred image transferred onto the recording medium thereon. The image forming apparatus includes, as needed, appropriately selected other members such as a charge eliminating member, a cleaning member, a recycling member, and a control member. Detailed description will be provided below.

—Electrostatic Latent Image Forming Step and Electrostatic Latent Image Forming Member—

The electrostatic latent image forming step is a step of forming an electrostatic latent image on an electrostatic latent image bearer.

For example, the material, shape, structure and size of the electrostatic latent image bearer (may also be referred to as "electrophotographic photoconductor" and "photoconductor") are not particularly limited and may be appropriately selected from publicly-known designs. Yet, a preferable example of the shape is a drum. Examples of the electrostatic latent image bearer in terms of material include inorganic photoconductors made of, for example, amorphous silicon and selenium, and organic photoconductors (OPC) made of, for example, polysilane and phthalopolymethine. Among these electrostatic latent image bearers, organic photoconductors (OPC) are preferable because higher-definition images can be obtained.

Formation of the electrostatic latent image can be performed by uniformly charging the surface of the electrostatic latent image bearer, and subsequently exposing the surface of the electrostatic latent image bearer to light imagewise, and can be performed by the electrostatic latent image forming member.

The electrostatic latent image forming member includes at least a charging member (charging device) configured to uniformly charge the surface of the electrostatic latent image bearer, and an exposure member (exposure device) configured to expose the surface of the electrostatic latent image bearer to light imagewise.

The charging can be performed by, for example, applying a voltage to the surface of the electrostatic latent image bearer, using the charging device.

The charging device is not particularly limited and may be appropriately selected in accordance with the intended purpose. Examples of the charging device include a publicly-known contact charging device including, for example, a conductive or semiconducting roll, brush, film, or rubber blade, and a contactless charging device utilizing a corona discharge, such as a corotron and a scorotron.

As the charging device, one that is positioned in contact with or out of contact with the electrostatic latent image bearer, and is configured to charge the surface of the electrostatic latent image bearer by applying superimposed direct-current and alternating-current voltages thereto is preferable.

It is preferable that the charging device is a charging roller positioned near the electrostatic latent image bearer out of contact via a gap tape, and it is preferable to charge the surface of the electrostatic latent image bearer by applying superimposed direct-current and alternating-current voltages to the charging roller.

The exposure to light can be performed by exposing the surface of the electrostatic latent image bearer to light imagewise, using the exposure device.

The exposure device is not particularly limited and may be appropriately selected in accordance with the intended purpose so long as it can expose the surface of the electrostatic latent image bearer charged by the charging device to light imagewise as the image intended to be formed. Examples of the exposure device include various types of exposure devices such as a photocopier optical system, a rod lens array system, a laser optical system, and a liquid crystal shutter optical device.

In the present disclosure, a backlight system configured to expose the back surface of the electrostatic latent image bearer to light imagewise may be employed.

—Developing Step and Developing Member—

The developing step is a step of developing the electrostatic latent image with the toner to form a visible image.

Formation of the visible image can be performed by, for example, developing the electrostatic latent image with the toner, and can be performed by the developing member.

As the developing member, for example, one that includes at least a developing device containing the toner and capable of supplying the toner to the electrostatic latent image in a contacting manner or contactlessly is preferable, and for example, a developing device including a toner stored container is more preferable.

The developing device may be a single-color developing device or a multiple-color developing device. A preferable example of the developing device is one that includes: a stirring device configured to rub and stir the toner to charge the toner; and a rotatable magnet roller.

In the developing device, for example, the toner and the carrier are mixed and stirred to generate friction, by which the toner is charged and borne on the surface of the rotating magnet roller in a chain-like form, to form a magnetic brush. As the magnetic roller is positioned near the electrostatic latent image bearer (photoconductor), the toner constituting the magnetic brush formed on the surface of the magnet roller is partially removed to the surface of the electrostatic latent image bearer (photoconductor) by an electric attractive force. As a result, the electrostatic latent image is developed with the toner, to form a visible image of the toner on the surface of the electrostatic latent image bearer (photoconductor).

—Transfer Step and Transfer Member—

The transfer step is a step of transferring the visible image onto a recording medium. A mode of employing an intermediate transfer medium to primarily transfer the visible image onto the intermediate transfer medium and then secondarily transfer the visible image onto the recording medium is preferable. A mode of using toners for two or more colors, each being the toner, preferably using full-color toners, and including a primary transfer step of transferring visible images onto the intermediate transfer medium to form a composite transferred image, and a secondary transfer step of transferring the composite transferred image onto the recording medium is more preferable.

The transferring can be performed by, for example, charging the visible image on the electrostatic latent image bearing member (photoconductor) using a transfer charger, and can be performed by the transfer member. As the transfer member, a mode of including a primary transfer member configured to transfer visible images onto the intermediate transfer medium to form a composite transferred image, and a secondary transfer member configured to transfer the composite transferred image onto a recording medium is preferable.

The intermediate transfer medium is not particularly limited and may be appropriately selected from publicly-known transfer media in accordance with the intended purpose. A preferable example of the intermediate transfer medium is a transfer belt.

As the transfer member (the primary transfer member and the secondary transfer member), one that includes at least a transfer device configured to charge the visible images formed on the electrostatic latent image bearer (photoconductor) with charges to be stripped off to the recording medium side is preferable. The number of the transfer member may be one, or two or more.

Examples of the transfer device include a corona transfer device based on a corona discharge, a transfer belt, a transfer roller, a pressure transfer roller, and an adhesive transfer device.

The recording medium is not particularly limited and may be appropriately selected from publicly-known recording media (recording paper).

—Fixing Step and Fixing Member—

The fixing step is a step of fixing the visible image transferred onto the recording medium thereon using a fixing device, and may be performed every time a developer of any color is transferred onto the recording medium, or may be performed at a time simultaneously in a state in which the developers of the respective colors are overlaid.

The fixing device is not particularly limited and may be appropriately selected in accordance with the intended purpose. A publicly-known heating pressurizing member is preferable. Examples of the heating pressurizing member include a combination of a heating roller and a pressurizing roller and a combination of a heating roller, a pressurizing roller, and an endless belt.

It is preferable that the fixing device is a member including: a heating element including a heat generating element; a film contacting the heating element; and a pressurizing member pressed against the heating element via the film, and configured to pass a recording medium, on which an unfixed image is formed, in between the film and the pressurizing member, to heat and fix the unfixed image. Typically, heating by the heating pressurizing member is preferably at from 80° C. through 200° C.

In the present disclosure, together with or instead of the fixing step and the fixing member, for example, a publicly-known optical fixing device may be used in accordance with the intended purpose.

The charge eliminating step is a step of applying a charge eliminating bias to the electrostatic latent image bearer to eliminate charges, and can be favorably performed by the charge eliminating member.

The charge eliminating member is not particularly limited, needs only to be able to apply a charge eliminating bias to the electrostatic latent image bearer, and may be appropriately selected from publicly-known charge eliminating devices. A preferable example of the charge eliminating member is a charge eliminating lamp.

The cleaning step is a step of removing the toner remaining on the electrostatic latent image bearer, and can be favorably performed by the cleaning member.

The cleaning member is not particularly limited, needs only to be able to remove the toner remaining on the electrostatic latent image bearer, and may be appropriately selected from publicly-known cleaners. Preferable examples of the cleaning member include a magnetic brush cleaner, an electrostatic brush cleaner, a magnetic roller cleaner, a blade cleaner, a brush cleaner, and a web cleaner.

The recycling step is a step of recycling the toner removed in the cleaning step to the developing member, and can be favorably performed by the recycling member. The recycling member is not particularly limited, and an example of the recycling member is a publicly-known conveying member.

The control step is a step of controlling each step, and each step can be favorably controlled by the control member.

The control member is not particularly limited and may be appropriately selected in accordance with the intended purpose so long as it can control the operations of each member. Examples of the control member include such devices as a sequencer and a computer.

Figure 6:
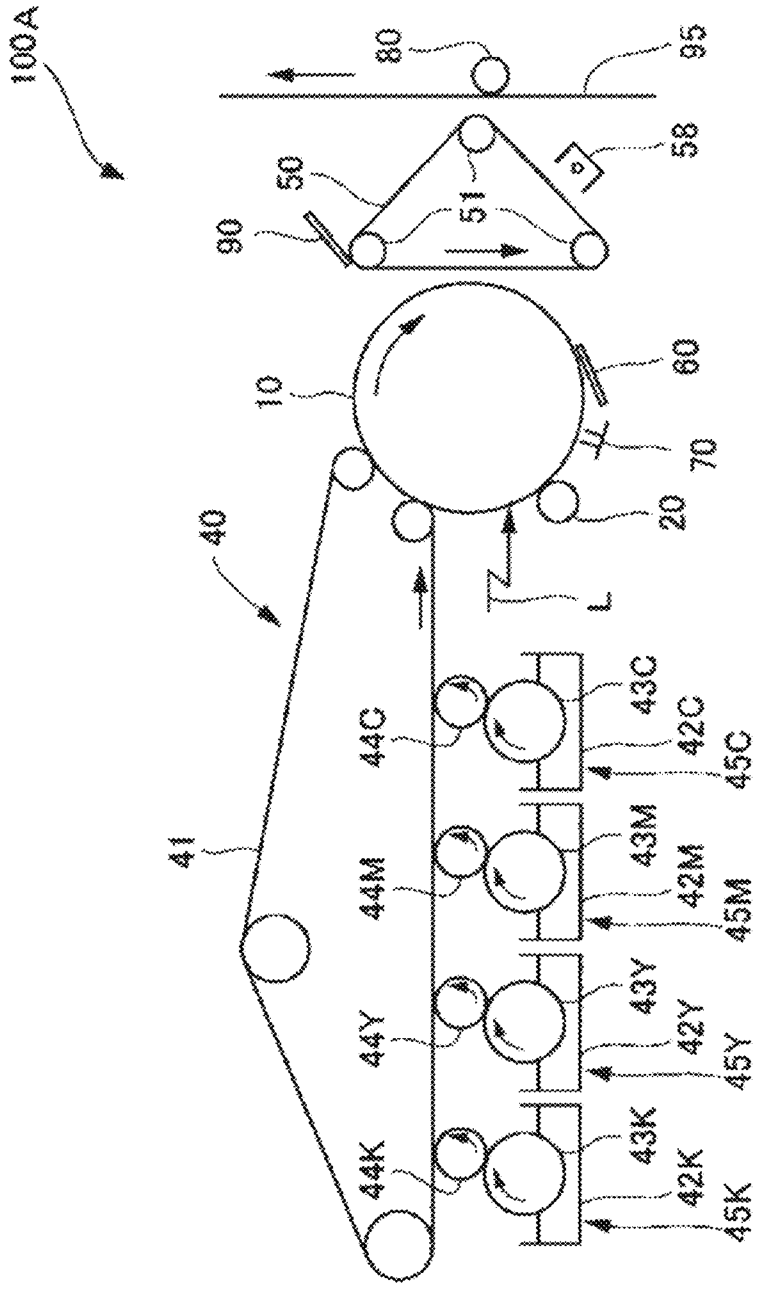
FIG. 6 is an exemplary view illustrating an example of an image forming apparatus according to an embodiment of the present disclosure.

FIG. 6 illustrates a first example of the image forming apparatus according to the present disclosure. An image forming apparatus 100A includes a photoconductor drum 10, a charging roller 20, an exposure device, a developing device 40, an intermediate transfer belt 50, a cleaning device 60 including a cleaning blade, and a charge eliminating lamp 70.

The intermediate transfer belt 50 is an endless belt tensely spanned over three rollers 51 situated inside the intermediate transfer belt 50, and can move in the direction of the arrow in the drawing. Some of the three rollers 51 also function as transfer bias rollers that can apply a transfer bias (primary transfer bias) to the intermediate transfer belt 50. A cleaning device 90 including a cleaning blade is situated near the intermediate transfer belt 50. A transfer roller 80 that can apply a transfer bias (secondary transfer bias) for transferring a toner image onto transfer paper 95 is situated counter to the intermediate transfer belt 50.

At a location on the perimeter of the intermediate transfer belt 50, a corona charging device 58 configured to apply charges to a toner image transferred onto the intermediate transfer belt 50 is situated between where the photoconductor drum 10 and the intermediate transfer belt 50 contact each other and where the intermediate transfer belt 50 and the transfer paper 95 contact each other in the rotation direction of the intermediate transfer belt 50.

The developing device 40 includes a developing belt 41, and a black developing member 45K, a yellow developing member 45Y, a magenta developing member 45M, and a cyan developing member 45C situated collectively at locations on the perimeter of the developing belt 41. The developing members 45 for the respective colors each include a developer container 42, a developer supplying roller 43, and a developing roller (developer bearing member) 44. The developing belt 41 is an endless belt tensely spanned over a plurality of belt rollers, and can move in the direction of the arrow in the drawing. A part of the developing belt 41 contacts the photoconductor drum 10.

Next, a method for forming an image using the image forming apparatus 100A will be described. First, the charging roller 20 uniformly charges the surface of the photoconductor drum 10, and then the exposure device (non-illustrated) emits exposure light L to which the photoconductor drum 10 is to be exposed, to form an electrostatic latent image. Next, the electrostatic latent image formed on the photoconductor drum 10 is developed with the toner supplied from the developing device 40, to form a toner image. The toner image formed on the photoconductor drum 10 is transferred (primarily transferred) onto the intermediate transfer belt 50 by a transfer bias applied from the rollers 51, and subsequently transferred (secondarily transferred) onto the transfer paper 95 by a transfer bias applied from the transfer roller 80. In the meantime, the toner remaining on the surface of the photoconductor drum 10 from which the toner image has been transferred onto the intermediate transfer belt 50 is removed by the cleaning device 60, and then charges on the surface of the photoconductor drum 10 are eliminated by the charge eliminating lamp 70.

Figure 7:
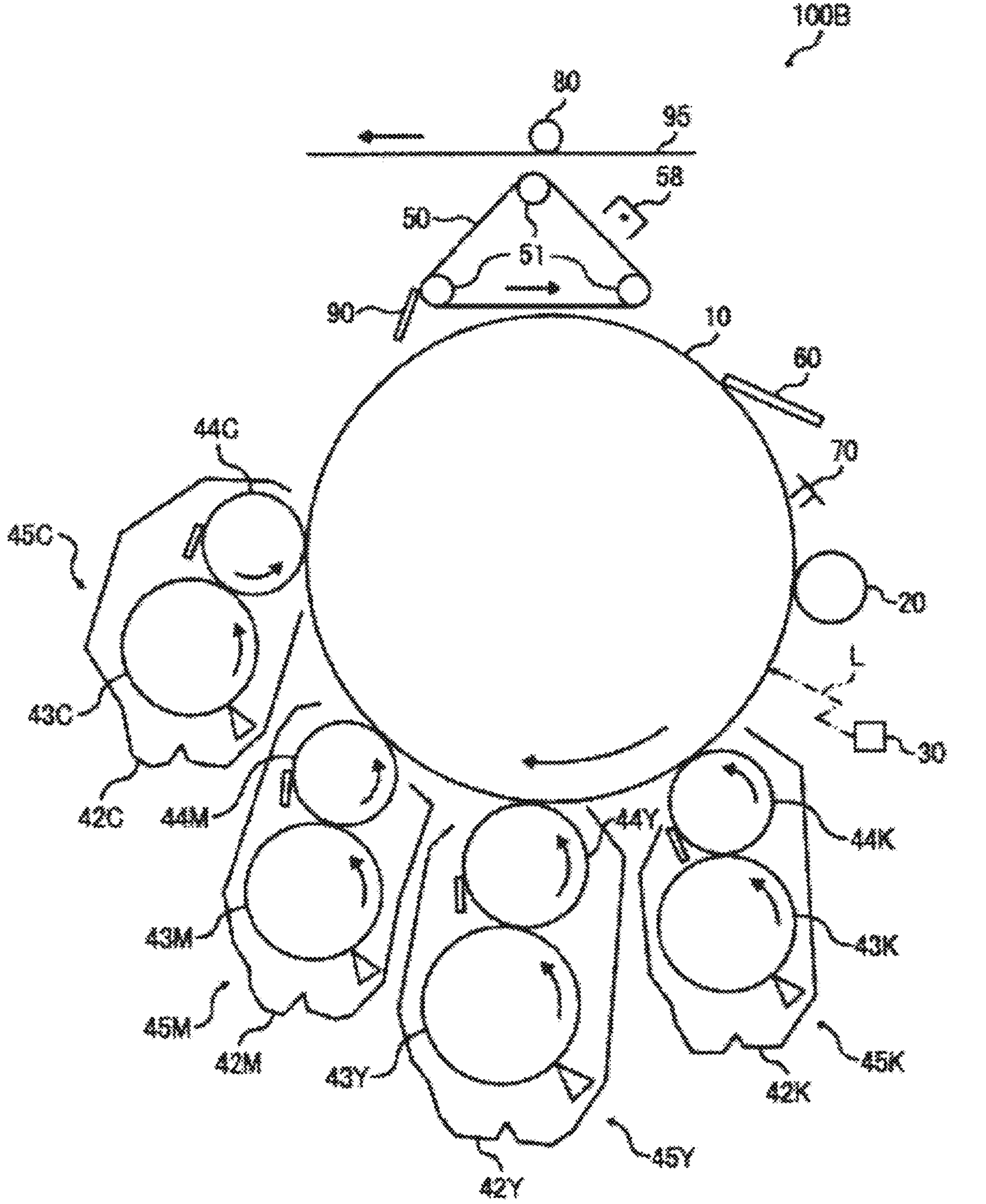
FIG. 7 is an exemplary view illustrating another example of an image forming apparatus according to an embodiment of the present disclosure.

FIG. 7 illustrates a second example of the image forming apparatus used in the present disclosure. An image forming apparatus 100B has the same configuration as that of the image forming apparatus 100A except that no developing belt 41 is provided, and a black developing member 45K, a yellow developing member 45Y, a magenta developing member 45M, and a cyan developing member 45C are situated directly counter to a photoconductor drum 10 on the perimeter of the photoconductor drum 10.

Figure 8:
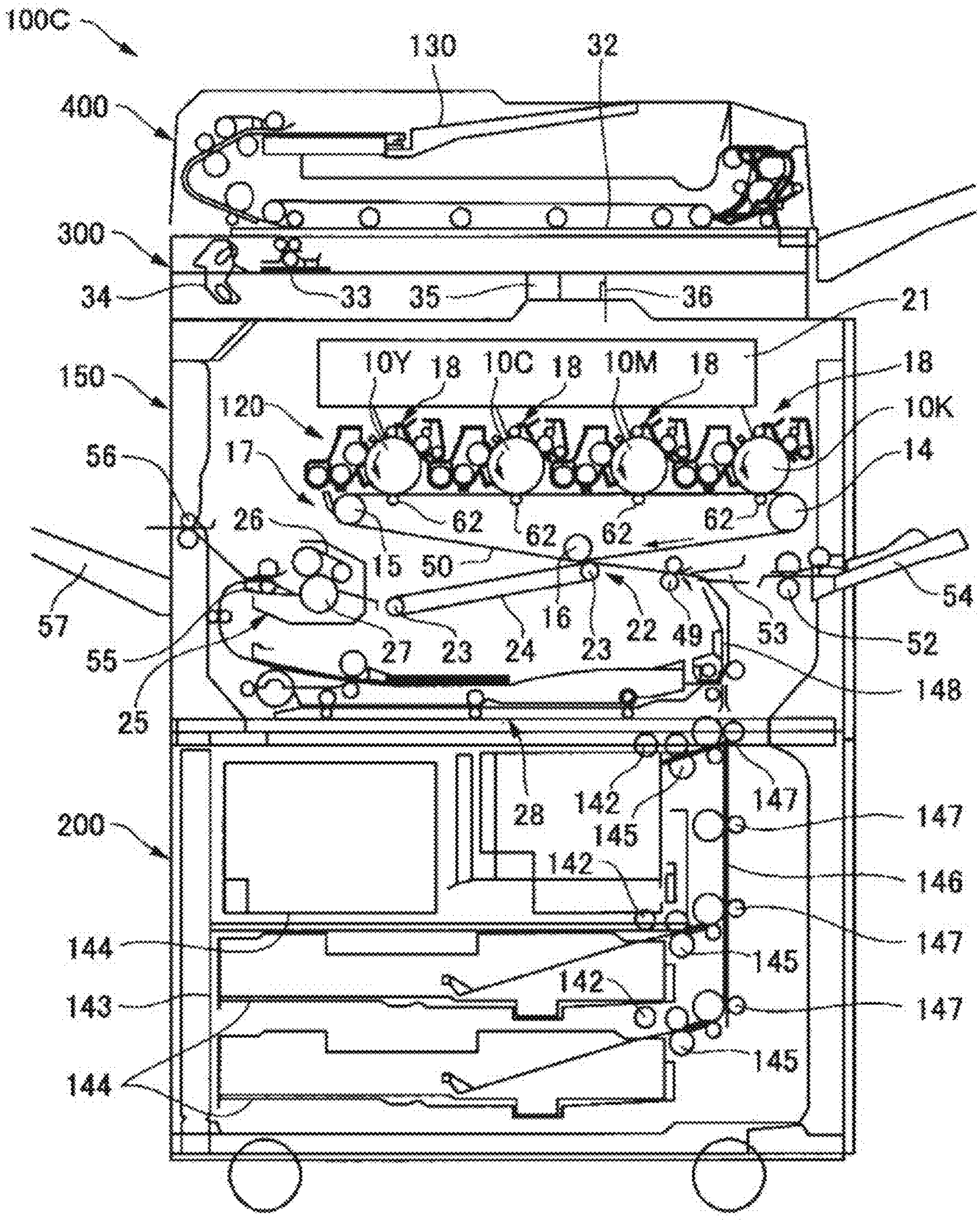
FIG. 8 is an exemplary view illustrating another example of an image forming apparatus according to an embodiment of the present disclosure.

FIG. 8 illustrates a third example of the image forming apparatus used in the present disclosure. An image forming apparatus 100C is a tandem-type color image forming apparatus, and includes a photocopying device body 150, a paper feeding table 200, a scanner 300, and an Automatic Document Feeder (ADF) 400.

An intermediate transfer belt 50 situated in the center of the photocopying device body 150 is an endless belt tensely spanned over three rollers 14, 15, and 16, and can move in the direction of the arrow in the drawing. A cleaning device 17 including a cleaning blade configured to remove a toner remaining on the intermediate transfer belt 50 from which a toner image has been transferred onto recording paper is situated near the roller 15. Yellow, cyan, magenta, and black image forming members 120Y, 120C, 120M, and 120K are situated side by side such that they are counter to the intermediate transfer belt 50 tensely spanned over the rollers 14 and 15, and such that they are along the conveying direction.

An exposure device 21 is situated near the image forming members 120. A secondary transfer belt 24 is situated on a side of the intermediate transfer belt 50 opposite to a side on which the image forming members 120 are situated. The secondary transfer belt 24 is an endless belt tensely spanned over a pair of rollers 23, and recording paper conveyed on the secondary transfer belt 24, and the intermediate transfer belt 50 can contact each other between the roller 16 and the roller 23.

A fixing device 25 including: a fixing belt 26, which is an endless belt tensely spanned over a pair of rollers; and a pressurizing roller 27 situated while being pushed onto the fixing belt 26 is situated near the secondary transfer belt 24. For cases where images are formed on both surfaces of recording paper, a sheet overturning device 28 configured to overturn the recording paper is situated near the secondary transfer belt 24 and the fixing device 25.

Next, a method of forming a full-color image using the image forming apparatus 100C will be described. First, a color original is set on a document table 130 of the automatic document feeder (ADF) 400, or the automatic document feeder 400 is opened, the color original is set on a contact glass 32 of the scanner 300, and the automatic document feeder 400 is closed. In response to a start switch being pressed, the scanner 300 is driven after the original is conveyed and moved onto the contact glass 32 in the case where the original is set on the automatic document feeder 400, or immediately in response to the start switch being pressed in the case where the original is set on the contact glass 32, and a first travelling element 33 including a light source and a second travelling element 34 including a mirror start travelling. Here, reflected light, of light emitted from the first travelling element 33, which is reflected from the surface of the original, is reflected by the second travelling element 34, and then received by a reading sensor 36 through an imaging forming lens 35. In this way, the original is scanned, and image information for black, yellow, magenta, and cyan is obtained.

Figure 9:
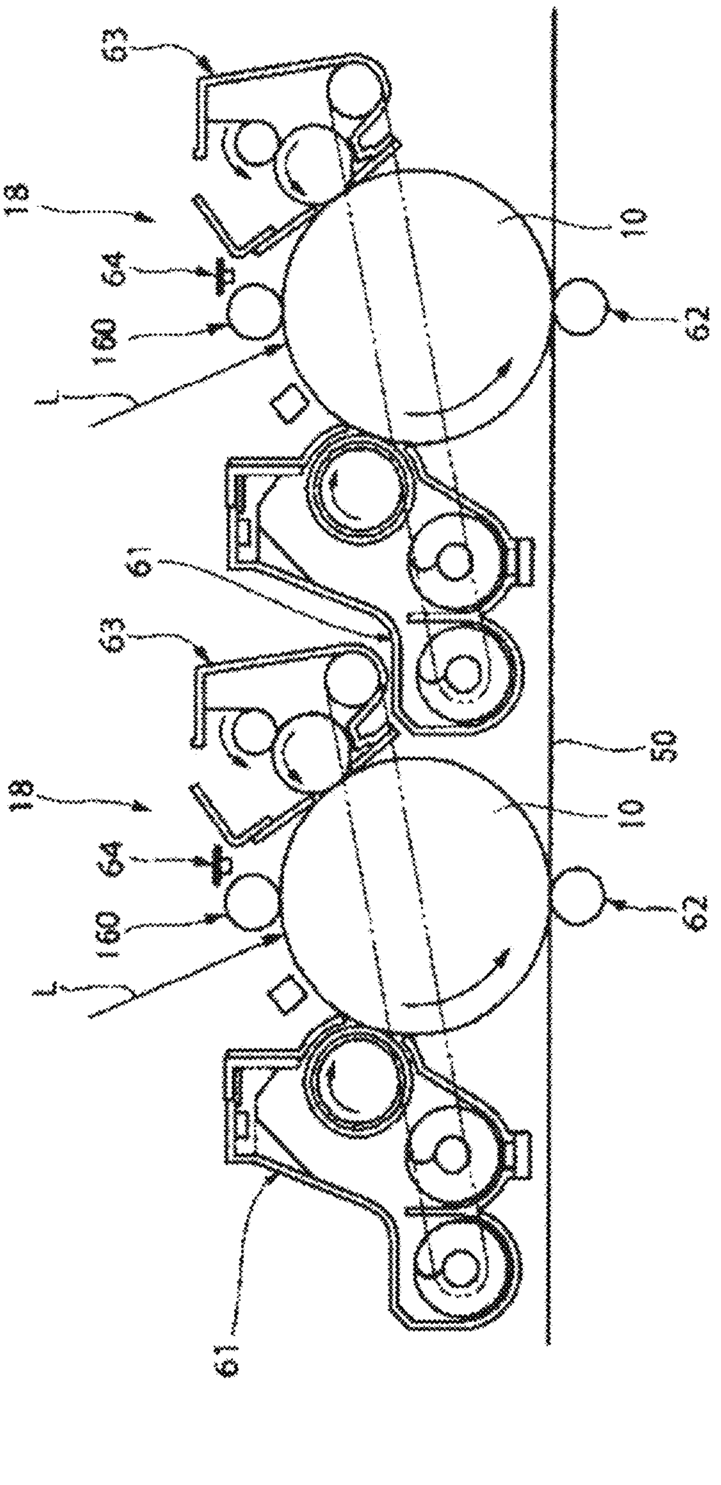
FIG. 9 is an exemplary view illustrating another example of an image forming apparatus according to an embodiment of the present disclosure.

Image information of each color is transmitted to the image forming member 120 of the corresponding color, and a toner image of the corresponding color is formed. As illustrated in FIG. 9, the image forming members 120 of the respective colors each include a photoconductor drum 10, a charging roller 160 configured to uniformly charge the photoconductor drum 10, an exposure device configured to emit exposure light L to which the photoconductor drum 10 is to be exposed based on the image information of the corresponding color, to form an electrostatic latent image of the corresponding color, a developing device 61 configured to develop the electrostatic latent image with the developer of the corresponding color to form a toner image of the corresponding color, a transfer roller 62 configured to transfer the toner image onto the intermediate transfer belt 50, a cleaning device 63 including a cleaning blade, and a charge eliminating lamp 64.

The toner images of the respective colors formed by the image forming members 120 of the respective colors are sequentially transferred (primarily transferred) onto the intermediate transfer belt 50 moving while being tensely spanned over the rollers 14, 15, and 16, and overlaid on each other, to form a composite toner image.

In the meantime, in the paper feeding table 200, one of paper feeding rollers 142 is selectively rotated to feed forward recording paper from one of paper feeding cassettes 144 situated multistage-wise in a paper bank 143, separating rollers 145 send out recording paper sheets separately one by one onto a paper feeding path 146, conveying rollers 147 convey the recording paper and guide it to a paper feeding path 148 in the photocopying device body 150, and the recording paper is stopped by being struck against registration rollers 49.

Alternatively, a paper feeding roller is rotated, to feed forward sheets of recording paper on a manual feed tray 54 one by one separately via separating rollers 52 and guide the recording paper onto a manual paper feed path 53. The recording paper is stopped by being struck against the registration rollers 49.

The registration rollers 49 are typically used while being grounded, yet may be used with bias application for removing paper dust of the recording paper. Next, the registration rollers 49 are rotated at a timing to meet the composite toner image formed on the intermediate transfer belt 50, to thereby send out the recording paper to between the intermediate transfer belt 50 and the secondary transfer belt 24 such that the composite toner image is transferred (secondarily transferred) onto the recording paper. Any toner remaining on the intermediate transfer belt 50 from which the composite toner image has been transferred is removed by the cleaning device 17.

The recording paper onto which the composite toner image is transferred is conveyed by the secondary transfer belt 24, and the composite toner image is fixed by the fixing device 25. Next, with conveying paths switched by a switching claw 55, the recording paper is ejected onto a paper ejection tray 57 by paper ejecting rollers 56. Alternatively, with conveying paths switched by the switching claw 55, the recording paper is overturned by the sheet overturning device 28, an image is formed on the back surface of the recording paper in the same manner, and then the recording paper is ejected onto the paper ejection tray 57 by the paper ejecting rollers 56.

The image forming method and the image forming apparatus according to the present disclosure can provide high-quality images for a long term.

EXAMPLES

The present disclosure will be described in detail by way of Examples below. The present disclosure should not be construed as being limited to Examples below. In the description of Examples, "%" means "% by mass", and "part" means "part by mass".

Example 1

<Production of Toner 1>

—Synthesis of Polyester Resin—

Reaction 1: An adduct of bisphenol A with 3 moles of ethylene oxide (EO) and 1,2-propylene glycol (PG) at a mole ratio of 90/10, and terephthalic acid (TPA) and adipic acid (APA) at a mole ratio of 70/30 were added at an OH/COOH ratio of 1.33 into a reaction container equipped with a nitrogen introducing tube, a dewatering tube, a stirrer, and a thermocouple, and were reacted in the presence of 500 ppm of titanium tetraisopropoxide at normal pressure at 230° C. for 10 hours.

Reaction 2: Next, the materials were reacted at a reduced pressure of from 10 mmHg through 15 mmHg for 5 hours.

Reaction 3: Next, trimellitic anhydride (TMA) (10 parts) was added into the reaction container, and the materials were reacted at 180° C. at normal pressure for 3 hours, to obtain [Polyester resin].

—Synthesis of Prepolymer—

An adduct of bisphenol A with 2 moles of ethylene oxide (682 parts), an adduct of bisphenol A with 2 moles of propylene oxide (81 parts), terephthalic acid (283 parts), trimellitic anhydride (22 parts), and dibutyl tin oxide (2 parts) were added into a reaction container equipped with a condenser tube, a stirrer, and a nitrogen introducing tube, and were reacted at normal pressure at 230° C. for 8 hours, and further reacted at a reduced pressure of from 10 mmHg through 15 mmHg for 5 hours, to obtain [Intermediate polyester resin].

The obtained [Intermediate polyester resin] had a number average molecular weight of 2,100, a weight average molecular weight of 9,500, a glass transition temperature (Tg) of 55° C., an acid value of 0.5 mgKOH/g, and a hydroxyl value of 51 mgKOH/g.

Next, [Intermediate polyester resin] (410 parts), isophorone diisocyanate (89 pats), and ethyl acetate (500 parts) were added into a reaction container equipped with a condenser tube, a stirrer, and a nitrogen introducing tube, and were reacted at 100° C. for 5 hours, to obtain [Prepolymer]. The obtained [Prepolymer] had a free isocyanate percentage of 1.53%.

—Preparation of Release Agent Dispersion Liquid—

Carnauba wax (WA-05 obtained from Cerarica Noda Co., Ltd.) (70 parts), [Polyester resin] (140 parts), and ethyl acetate (290 parts) were added into a container equipped with a stirring bar and a thermometer, and were subjected to temperature raising to 75° C. while being stirred, retained at 75° C. for 1.5 hours, subsequently cooled to 30° C. in 1 hour, and subjected to dispersion treatment using a bead mill (ULTRAVISCO MILL, obtained from Imex Co., Ltd.) at a liquid sending rate of 5 kg/hr, at a disk peripheral velocity of 6 m/sec, with a Φ0.5 mm zirconia beads at a packing proportion of 80% by volume, for 3 passes, to obtain [Release agent dispersion liquid].

—Preparation of Masterbatch—

Water (1,000 parts), Pigment Yellow 185 (1,000 parts), and [Polyester resin] (1,000 parts) were added together, and mixed using a Henschel mixer (obtained from Nippon Coke & Engineering. Co., Ltd.). The mixture was kneaded using two rolls at 150° C. for 30 minutes, rolled, cooled, and subsequently pulverized using a pulverizer, to obtain [Masterbatch 1].

—Preparation of Layered Inorganic Mineral Masterbatch—

[Polyester resin] (100 parts), a montmorillonite compound modified with a quaternary ammonium salt containing a benzyl group in at least a part thereof (CLAYTONE APA, obtained from Southern Clay Products, Inc., having a particle diameter of 500 nm) (100 parts), and ion-exchanged water (50 parts) were mixed well, and kneaded using an open roll-type kneader (KNEADEX, obtained from Nippon Coke & Engineering. Co., Ltd.). The materials were kneaded at a kneading start temperature of 90° C., and then gradually cooled to 50° C., to produce [Layered inorganic mineral masterbatch 1] having a resin/pigment ratio (mass ratio) of 1:1.

—Production of Oil Phase 1—

[Polyester resin] (70.4 parts), [Release agent dispersion liquid] (113 parts), [Masterbatch 1] (68 parts), and [Layered inorganic mineral masterbatch 1] (1.6 parts), and ethyl acetate (122 parts) were added into a container equipped with a thermometer and a stirrer, subjected to dispersion treatment using a shear dispersion device (TK homomixer) at a peripheral velocity of 13.5 m/sec, and subsequently subjected to dispersion treatment using a bead mill (ULTRAVISCO MILL, obtained from Imex Co., Ltd.) at a liquid sending rate of 5 kg/hr, at a disk peripheral velocity of 10 m/sec, with a Φ0.3 mm zirconia beads at a packing proportion of 80% by volume, for 3 passes, to obtain [Oil phase 1].

—Production of Water Dispersion Liquid of Resin Particles—

Water (600 parts), styrene (120 parts), methacrylic acid (100 parts), butyl acrylate (45 parts), sodium alkylallylsulfosuccinate salt (ELEMINOL JS-2, obtained from Sanyo Chemical Industries, Ltd.) (10 parts), and ammonium persulfate (1 part) were added into a reaction container equipped with a stirring bar and a thermometer, and stirred at 400 rpm for 20 minutes, to obtain a white emulsion. The emulsion was heated until the temperature in the system rose to 75° C., and reacted for 6 hours. A 1% ammonium persulfate aqueous solution (30 parts) was further added to the resulting product, which was then aged at 75° C. for 6 hours, to obtain [Water dispersion liquid of resin particles]. The volume average particle diameter of the particles contained in [Water dispersion liquid of resin particles] was 60 nm. The weight average molecular weight of the resin fraction was 140,000 and Tg thereof was 73° C.

—Preparation of Water Phase—

Water (990 parts), [Water dispersion liquid of resin particles] (83 parts), a 48.5% sodium dodecyl diphenyl ether disulfonate aqueous solution (ELEMINOL MON-7, obtained from Sanyo Chemical Industries, Ltd.) (37 parts), and ethyl acetate (90 parts) were mixed and stirred, to obtain [Water phase].

—Emulsification or Dispersion—

A [Prepolymer] ethyl acetate solution (77 parts), and a 50% isophoronediamine ethyl acetate solution (2.5 parts) were added to [Oil phase 1](374 parts), stirred using a TK-type homomixer (obtained from Primix Corporation) at a rotation rate of 5,000 rpm to be uniformly dissolved and dispersed, to obtain [Oil Phase 1']. Next, [Water phase] (550 parts) was added into another container equipped with a stirrer and a thermometer, and stirred using a TK-type homomixer (obtained from Primix Corporation) at 11,000 rpm while [Oil phase 1'] was added thereinto, and the resulting product was emulsified for 1 minute, left to stand for 20 seconds, and subsequently additionally stirred using the TK-type homomixer at 8,000 rpm for 1 minute, to obtain [Emulsified slurry 1].

—Desolventization-Washing-Drying—

[Emulsified slurry 1] was added into a container equipped with a stirrer and a thermometer, and desolventized at a reduced pressure at 30° C. for 8 hours, to obtain [Slurry 1]. The obtained [Slurry 1] was retained at 45° C. for 2 hours, filtrated at a reduced pressure, and subjected to the following washing treatment.

(1) Ion-exchanged water (100 parts) was added to the obtained filtration cake. They were mixed using a TK homomixer (at a rotation rate of 6,000 rpm for 5 minutes), and subsequently filtrated.

(2) Ion-exchanged water (100 parts) was added to the filtration cake obtained in (1) above. They were mixed using a TK homomixer (at a rotation rate of 6,000 rpm for 5 minutes). Subsequently, while the resulting product was stirred, 1% hydrochloric acid was added until pH became approximately 3.3. In this state, the resulting product was stirred for 1 hour, and subsequently filtrated.

(3) Ion-exchanged water (300 parts) was added to the filtration cake obtained in (2) above. They were mixed using a TK homomixer (at a rotation rate of 6,000 rpm for 5 minutes), and subsequently filtrated.

This operation was performed twice, to obtain a filtration cake 1.

The obtained filtration cake 1 was dried using an air circulation dryer at 40° C. for 48 hours, and subsequently sieved through a mesh having a mesh size of 75 μm, to produce [Toner base particles 1].

—Mixing—

Hydrophobic silica (HDK-2000, obtained from Wacker Chemie AG) was added to [Toner base particles 1] in an amount of 1.5 parts relative to 100 parts of the base particles, and they were mixed using a 20 L Henschel mixer (obtained from Nippon Coke & Engineering. Co., Ltd.) at a peripheral velocity of 33 m/s for 5 minutes. The resulting product was subjected to air elutriation using a sieve having a mesh size of 500, to obtain [Toner 1].

Example 2

[Toner 2] was produced in the same manner as in Example 1, except that in the production process of [Emulsified slurry 1], the additional stirring using the TK-type homomixer was performed at a rotation rate of 6,000 rpm unlike in Example 1.

Example 3

[Toner 3] was produced in the same manner as in Example 2, except that in the production process of [Emulsified slurry 1], the additional stirring using the TK-type homomixer was performed at a rotation rate of 4,000 rpm unlike in Example 2.

Example 4

[Toner 4] was produced in the same manner as in Example 3, except that in the production process of [Emulsified slurry 1], the time for which the product resulting from addition of [Oil phase 1'] and emulsification for 1 hour was left to stand was changed to 60 seconds, and the additional stirring using the TK-type homomixer was performed at a rotation rate of 3,000 rpm unlike in Example 3.

Example 5

[Toner 5] was produced in the same manner as in Example 4, except that in the production process of [Emulsified slurry 1], the time for which the product resulting from addition of [Oil phase 1'] and emulsification for 1 hour was left to stand was changed to 40 seconds unlike in Example 4.

Example 6

[Toner 6] was produced in the same manner as in Example 5, except that in the production process of [Emulsified slurry 1], the time for which the product resulting from addition of [Oil phase 1'] and emulsification for 1 hour was left to stand was changed to 30 seconds unlike in Example 5.

Example 7

[Toner 7] was produced in the same manner as in Example 6, except that in the production process of [Emulsified slurry 1], the time for which the product resulting from addition of [Oil phase 1'] and emulsification for 1 hour was left to stand was changed to 20 seconds unlike in Example 6.

Example 8

[Toner 8] was produced in the same manner as in Example 7, except that in the production process of [Oil phase 1], the disk peripheral velocity for dispersion treatment using the bead mill was changed to 12 m/sec unlike in Example 7.

Comparative Example 1

[Toner 9] was produced in the same manner as in Example 7, except that in the production process of [Emulsified slurry 1], the additional stirring after addition of [Oil phase 1'] and emulsification for 1 hour was not performed unlike in Example 7.

Comparative Example 2

[Toner 10] was produced in the same manner as in Comparative Example 1, except that in the production process of [Oil phase 1], the disk peripheral velocity for dispersion treatment using the bead mill was changed to 12 m/sec unlike in Comparative Example 1.

Comparative Example 3

[Toner 11] was produced in the same manner as in Example 7, except that in the production process of [Oil phase 1], the disk peripheral velocity for dispersion treatment using the bead mill was changed to 13 m/sec unlike in Example 7.

Comparative Example 4

[Toner 12] was produced in the same manner as in Example 7, except that in the production process of [Emulsified slurry 1], the additional stirring using the TK-type homomixer was performed at a rotation rate of 10,000 rpm unlike in Example 7.

Comparative Example 5

[Toner 13] was produced in the same manner as in Example 7, except that in the production process of [Emulsified slurry 1], the time for which the product resulting from addition of [Oil phase 1'] and emulsification for 1 hour was left to stand was changed to 150 seconds unlike in Example 7.

Production conditions of the toners obtained as described above and other matters are presented in Table 1.

TABLE 1

| | | | Shear force application after granulation | | |
|---|---|---|---|---|---|
| Toner No. | Ex. and Comp. Ex. No. | Media dispersion Peripheral velocity [m/s] | Presence/absence | Rotation rate [rpm] | Waiting time from after granulation until before shear force application [sec] |
| Toner 1 | Ex. 1 | 10 | Present | 8,000 | 20 |

TABLE 1-continued

| | | | Shear force application after granulation | | |
|---|---|---|---|---|---|
| Toner No. | Ex. and Comp. Ex. No. | Media dispersion Peripheral velocity [m/s] | Presence/absence | Rotation rate [rpm] | Waiting time from after granulation until before shear force application [sec] |
| Toner 2 | Ex. 2 | 10 | Present | 6,000 | 20 |
| Toner 3 | Ex. 3 | 10 | Present | 4,000 | 20 |
| Toner 4 | Ex. 4 | 10 | Present | 3,000 | 60 |
| Toner 5 | Ex. 5 | 10 | Present | 3,000 | 40 |
| Toner 6 | Ex. 6 | 10 | Present | 3,000 | 30 |
| Toner 7 | Ex. 7 | 10 | Present | 3,000 | 20 |
| Toner 8 | Ex. 8 | 12 | Present | 3,000 | 20 |
| Toner 9 | Comp. Ex. 1 | 10 | Absent | — | — |
| Toner 10 | Comp. Ex. 2 | 12 | Absent | — | — |
| Toner 11 | Comp. Ex. 3 | 13 | Present | 3,000 | 20 |
| Toner 12 | Comp. Ex. 4 | 10 | Present | 10,000 | 20 |
| Toner 13 | Comp. Ex. 5 | 10 | Present | 3,000 | 150 |

(Measurement)

The toners obtained in Examples and Comparative Examples described above were measured in terms of the following properties.

<Lc Measurement>

Raman spectrums of 300 or more toner particles were measured particle by particle, using a Raman microscope "XploRA PLUS" (obtained from HORIBA, Ltd.) with a laser having an excitation wavelength of 638 nm.

LC values were calculated from the Raman spectrums, and the proportion of particles having LC that deviated by 25.0% or greater and the proportion of particles having LC that deviated by 50.0% or greater were calculated.

The results are presented in Table 2.

<Charging Amount Distribution Measurement>

The charging amount (μC/g) of the toner was measured using a blow-off powder charge measurement system TB-200 (obtained from Kyocera Chemical Corporation). For the charging amount distribution, a Q/d distribution (fC/μm) was measured using a charging amount distribution measurement system E-SPART ANALYZER (obtained from Hosokawa Micron Corporation), and the proportion of particles in the positive charge range was calculated as WST proportion.

The results are presented in Table 2.

<Granularity Distribution Measurement>

For measuring the granularity distribution of the toner, a COULTER MULTISIZER III (obtained from Beckman Coulter, Inc., product name) was used. A personal computer (obtained from IBM Co., Ltd.) including dedicated analyzing software (obtained from Beckman Coulter, Inc.) was connected to the COULTER MULTISIZER III, and a ratio (Dv/Dn) was calculated based on a volume-base weight average particle diameter (Dv) and a number average particle diameter (Dn) obtained from a number distribution.

The results are presented in Table 2.

<Shape Distribution Measurement>

The average circularity of 3,000 or more particles was measured using a flow-type particle image analyzer FPIA-3000 (obtained from Sysmex Corporation, product name), and the number percentage of particles having a circularity of 0.850 or less in the measured particles was calculated.

TABLE 2

| | | LC | | Charging | | Shape distribution |
|---|---|---|---|---|---|---|
| Toner No. | Ex. and Comp. Ex. No. | % by number of particles deviating by ≥25.0% | % by number of particles deviating by ≥50.0% | amount distribution WST proportion [%] | Particle size distribution Dv/Dn | % by number of particles with circularity of ≤0.850 |
| Toner 1 | Ex. 1 | 24.9 | 3.0 | 7.7 | 1.14 | 1.2 |
| Toner 2 | Ex. 2 | 22.9 | 2.6 | 7.7 | 1.14 | 1.2 |
| Toner 3 | Ex. 3 | 19.6 | 2.1 | 7.5 | 1.13 | 1.1 |
| Toner 4 | Ex. 4 | 20.1 | 2.3 | 7.6 | 1.14 | 1.2 |
| Toner 5 | Ex. 5 | 15.9 | 1.7 | 7.3 | 1.13 | 1.1 |
| Toner 6 | Ex. 6 | 13.0 | 1.3 | 7.3 | 1.12 | 1.0 |
| Toner 7 | Ex. 7 | 5.5 | 0.2 | 7.1 | 1.12 | 1.0 |
| Toner 8 | Ex. 8 | 1.5 | 0.1 | 7.0 | 1.12 | 0.9 |
| Toner 9 | Comp. Ex. 1 | 29.0 | 3.5 | 7.9 | 1.14 | 1.2 |
| Toner 10 | Comp. Ex. 2 | 25.3 | 3.3 | 7.6 | 1.14 | 1.1 |
| Toner 11 | Comp. Ex. 3 | 0.7 | 0.1 | 7.7 | 1.12 | 1.0 |
| Toner 12 | Comp. Ex. 4 | 29.9 | 3.7 | 8.5 | 1.15 | 1.3 |
| Toner 13 | Comp. Ex. 5 | 26.3 | 3.4 | 7.9 | 1.14 | 1.2 |

<Production of Developer>

Each of the above-described [Toner 1] to [Toner 13] (5 parts), and a below-described carrier (95 parts) were mixed using a TURBULA SHAKER MIXER (obtained from Shinmaru Enterprises Corporation), to obtain [Developer 1] to [Developer 13].

—Production of Carrier—

Silicone resin (organo-straight silicone): 100 parts

Toluene: 100 parts

γ-(2-Aminoethyl)aminopropyl trimethoxysilane: 5 parts

Carbon black: 10 parts

A mixture of the components specified above was subjected to dispersion treatment using a homomixer for 20 minutes, to prepare a coating layer forming liquid. Using a fluidized bed coater, the surface of a spherical magnetite having a particle diameter of 50 μm (1,000 parts) was coated with the coating layer forming liquid, to obtain a magnetic carrier.

Using an image forming apparatus employing each of [Developer 1] including [Toner 1] to [Developer 13] including [Toner 13], image transferability, device contamination resistance, scattering property, cleanability, and coloring degree were evaluated in the evaluation manners described below.

[Transferability Evaluation]

Using a photocopier (IMAGIO MP 7501) evaluation device obtained from Ricoh Company, Ltd., and tuned to a linear velocity of 162 mm/sec and a transfer time of 40 msec, a running test for each of [Developer 1] to [Developer 13] was performed by outputting a solid pattern as a test image on a A4-size medium, such that the amount of the toner to be attached would be 0.6 mg/cm$^2$. In an initial period of the test image and after 100K output, the transfer efficiency in the primary transfer was calculated according to (Formula 2) below, and the transfer efficiency in the secondary transfer was calculated according to (Formula 3) below, respectively. The evaluation criteria are as described below.

$$\text{Primary transfer efficiency (\%)} = (\text{Amount of toner transferred onto intermediate transfer medium/Amount of toner developed on electrophotographic photoconductor}) \times 100 \quad \text{(Formula 2)}$$

$$\text{Secondary transfer effeciency (\%)} = [(\text{Amount of toner transferred onto intermediate transfer medium} - \text{Amount of toner remaining untransferred on intermediate transfer medium})/\text{Amount of toner transferred onto intermediate transfer medium}] \times 100 \quad \text{(Formula 3)}$$

—Evaluation Criteria—

A transfer rate was calculated by multiplying the primary transfer efficiency by the secondary transfer efficiency, and evaluated according to the following evaluation criteria.

Rank: Transfer rate
10: 99.0% or higher
9: 98.0% or higher and lower than 99.0%
8: 96.0% or higher and lower than 98.0%
7: 94.0% or higher and lower than 96.0%
6: 92.0% or higher and lower than 94.0%
5: 90.0% or higher and lower than 92.0%
4: 88.0% or higher and lower than 90.0%
3: 86.0% or higher and lower than 88.0%
2: 84.0% or higher and lower than 86.0%
1: Lower than 84.0%

[Device Contamination Resistance Evaluation]

Device contamination resistance was evaluated using a DIGITAL COLOR IMAGIO NEO C600 remodeled device obtained from Ricoh Company, Ltd., which was loaded with each of [Developer 1] to [Developer 13]. Any contamination on a printed matter that was obtained after an image chart having an image occupation area rate of 50% was output on 100,000 sheets in a running manner in a single color mode, and any contamination anywhere around the fixed image ejection portion were visually observed, and evaluated based on comparison with a 10-rank (R1 to R10) ranking sample.

As the rank is lower, contamination on the printed matter and anywhere around the fixed image ejection portion is severer. The R1 rank is a level at which an intolerable level of contamination was observed both from anywhere around the fixing portion and the printed matter, and the test specimen cannot be adopted as a commercial product.

[Scattering Property Evaluation]

A scattering property was evaluated in order to measure scattering of a trace toner in the device that could not be observed by Device contamination resistance evaluation. Scattering of a trace toner would not generate adverse effects in the device in a middle-term use, but would generate effects as smears on images in the long term because the scattered toner would promote contamination in the device.

The scattering property was evaluated using a developing roller detached from IMAGIO-MPC5002 obtained from Ricoh Company, Ltd. and loaded with each of [Developer 1] to [Developer 13]. The developing roller was alone rotated at 700 rpm for 1 minute, and any toner that would scatter out of the developing roller was collected, to measure the mass of the scattered toner.

—Evaluation Criteria—

Rank: Mass of scattered toner

10: 10 mg or less

9: 10 mg or greater and less than 15 mg

8: 15 mg or greater and less than 20 mg

7: 20 mg or greater and less than 25 mg

6: 25 mg or greater and less than 30 mg

5: 30 mg or greater and less than 35 mg

4: 35 mg or greater and less than 40 mg

3: 40 mg or greater and less than 45 mg

2: 45 mg or greater and less than 50 mg

1: 50 mg or greater

[Blade Cleanability Evaluation]

For blade cleanability evaluation, using a color photocopier (IPSIO COLOR 8100, obtained from Ricoh Company, Ltd.), which was loaded with each of [Developer 1] to [Developer 13] and with the electrostatic latent image bearer (electrophotographic photoconductor, photoconductor), an image having a printing rate, expressed by the image occupation area rate, of 7% was output on 100,000 sheets of 6000 PAPER (obtained from Ricoh Company, Ltd.) in a running manner, and subsequently an image having an image occupation area rate of 50% was continuously output on 10 sheets in an environment at 10° C. at 15, RH. The device was stopped during developing of the tenth image. Here, the toner on the photoconductor drum ahead of the cleaning blade and the toner on the drum past the cleaning blade were separately transferred onto tapes. Using X-Rite eXact (obtained from X-Rite $I_{nc}$.), ID was measured from the transfer tapes pasted on 6000 PAPER, and a cleaning rate was calculated based on the ID according to a formula (4) below.

$$\text{Cleaning rate [\%]} = \Delta ID \qquad \text{Formula 4}$$

$$(ID \text{ from toner remaining untransferred} - ID \text{ after cleaning}) / ID \text{ from toner remaining untransferred}$$

—Evaluation Criteria—

Rank: Cleaning rate

5: 80% or higher

4: 60% or higher and lower than 80%

3: 40% or higher and lower than 60%

2: 20% or higher and lower than 40%

1: Lower than 20%

Rank 2 is a level comparable to existing products, and Rank 1 is a level at which the test specimen cannot be adopted as a commercial product.

[Coloring Degree Evaluation]

Each toner was transferred onto a sheet of paper at a density of 0.35 mg/cm$^2$, to form a rectangular image having a size of 1 cm or greater×1 cm or greater. ID was measured from the generated image using X-Rite eXact (obtained from X-Rite Inc.), to evaluate the coloring degree.

—Evaluation Criteria—

Rank: ID

10: 1.42 or higher

9: 1.40 or higher and lower than 1.42

8: 1.38 or higher and lower than 1.40

7: 1.36 or higher and lower than 1.38

6: 1.34 or higher and lower than 1.36

5: 1.32 or higher and lower than 1.34

4: 1.30 or higher and lower than 1.32

3: 1.28 or higher and lower than 1.30

2: 1.26 or higher and lower than 1.28

1: Lower than 1.26

<Comprehensive Rating>

The evaluation criteria for comprehensive rating was as described below.

The rank numbers of all evaluation items were summed up to calculate a rank number sum. Based on the rank number sum, each toner was evaluated by 5-stage rating.

"A" is a superlatively good level, "B" is an extremely good level, "C" is a good level, "D" is a level comparable to existing products, and "E" was a level at which the test specimen cannot be practically used. "A", "B", and "C" are pass levels, and "D" and "E" are fail levels.

Any toner having a blade cleanability rank "1" was rated "E" in the comprehensive rating, regardless of the rank number sum.

Comprehensive rating: Rank number sum

A: 42 or greater

B: from 40 through 41

C: from 36 through 39

D: 35 or lower

E: Blade cleanability rank was 1

The results obtained from the above evaluations are presented in Table 3.

TABLE 3

| Toner No. | Ex. and Comp. Ex. No. | Transferability | Device contamination resistance | Scattering property | Blade cleanability | Coloring degree | Rank number sum | Comprehensive rating |
|---|---|---|---|---|---|---|---|---|
| Toner 1 | Ex. 1 | 9 | 10 | 7 | 4 | 6 | 36 | C |
| Toner 2 | Ex. 2 | 9 | 10 | 7 | 4 | 7 | 37 | C |
| Toner 3 | Ex. 3 | 10 | 10 | 8 | 4 | 7 | 39 | C |
| Toner 4 | Ex. 4 | 9 | 10 | 7 | 4 | 8 | 38 | C |
| Toner 5 | Ex. 5 | 10 | 10 | 8 | 4 | 8 | 40 | B |
| Toner 6 | Ex. 6 | 10 | 10 | 9 | 4 | 6 | 42 | A |
| Toner 7 | Ex. 7 | 10 | 10 | 10 | 4 | 10 | 44 | A |
| Toner 8 | Ex. 8 | 10 | 10 | 10 | 3 | 10 | 43 | A |
| Toner 9 | Comp. Ex. 1 | 9 | 10 | 5 | 4 | 5 | 33 | D |
| Toner 10 | Comp. Ex. 2 | 10 | 10 | 5 | 3 | 5 | 33 | D |
| Toner 11 | Comp. Ex. 3 | 10 | 10 | 10 | 1 | 10 | 41 | E |
| Toner 12 | Comp. Ex. 4 | 8 | 9 | 3 | 3 | 4 | 27 | D |
| Toner 13 | Comp. Ex. 5 | 9 | 10 | 5 | 4 | 5 | 33 | D |

As is clear from the evaluation results in Table 3, in Examples 1 to 8, all of transferability, device contamination resistance, scattering property, blade cleanability, and coloring degree were satisfied at high levels. On the other hand, in Comparative Examples 1 to 5, any of the five items achieved a low level result.

Aspects of the present disclosure are, for example, as follows.

(1) A yellow toner, including at least:

a binder resin; and a pigment, wherein in a case where an intensity of a Raman spectrum of each toner particle at a wavenumber λ, at which a total intensity obtained by summing up Raman spectrums of toner particles that occur in a wavenumber range of 950 $cm^{-1}$ or greater and 3,250 $cm^{-1}$ or less in Raman spectroscopy of the yellow toner is maximum, is normalized to 1, and when a distribution is generated for 300 or more toner particles regarding LC that is calculated according to a formula (3) below based on a $CH_7$ rate defined by a formula (1) below and a $CH_s$ rate defined by a formula (2) below where $I_n$ represents an integrated intensity of a Raman spectrum of a center portion of each toner particle that occurs in a wavenumber range of 2,750 $cm^{-1}$ or greater and 3,250 $cm^{-1}$ or less and an integrated intensity of a Raman spectrum of a surface portion of each toner particle that occurs in the wavenumber range of 2,750 $cm^{-1}$ or greater and 3,250 $cm^{-1}$ or less, and $I_{ave}$ represents an average value of the $I_n$, a percentage by number of toner particles having the LC that deviates from a median of the distribution of the LC by an absolute value of 25.0% or greater is 1.0% by number or greater and 25.0% by number or less, $$CH_c \text{ rate } (\%) = \left[(I_{nc} - I_{ave})/I_{ave}\right] \times 100 \quad (1)$$

$$CH_s \text{ rate } (\%) = \left[(I_{ns} - I_{ave})/I_{ave}\right] \times 100 \quad (2)$$

$$LC\ (\%) = CH_s \text{ rate } (\%) - CH_c \text{ rate } (\%) \quad (3)$$

where $I_{nc}$ represents the integrated intensity of the Raman spectrum of the center portion of an n-th toner particle in the wavenumber range of 2,750 $cm^{-1}$ or greater and 3,250 $cm^{-1}$ or less, $I_{ns}$ represents the integrated intensity of the Raman spectrum of the surface portion of the n-th toner particle in the wavenumber range of 2,750 $cm^{-1}$ or greater and 3,250 $cm^{-1}$ or less, and $I_{ave}$ represents the average value of the $I_n$ of the toner particles including their center portions and surface portions.

(2) The yellow toner according to (1), wherein the percentage by number of the toner particles having the LC that deviates from the median of the distribution of the LC by the absolute value of 25.0% or greater is 5.0% by number or greater and 15.0% by number or less.

(3) The yellow toner according to (1) or (2), wherein the percentage by number of the toner particles having the LC that deviates from the median of the distribution of the LC by an absolute value of 50.0% or greater is 3.0% by number or less.

(4) The yellow toner according to any one of (1) to (3), wherein the percentage by number of the toner particles having the LC that deviates from the median of the distribution of the LC by the absolute value of 50.0% or greater is 1.5% by number or less.

(5) A developer, including:

the yellow toner of any one of (1) to (4).

(6) A process cartridge, including:

an electrostatic latent image bearer; and a developing member configured to develop an electrostatic latent image formed on the electrostatic latent image bearer with the developer of (5), wherein the electrostatic latent image bearer and the developing member are supported in an integrated state in the process cartridge, and the process cartridge is detachably attachable on a body of an image forming apparatus.

(7) An image forming apparatus, including:

an electrostatic latent image bearer;

an electrostatic latent image forming member configured to form an electrostatic latent image on the electrostatic latent image bearer;

a developing member configured to develop the electrostatic latent image with the developer of (5), to form a visible image;

a transfer member configured to transfer the visible image onto a recording medium; and a fixing member configured to fix a transferred image transferred onto the recording medium thereon.

(8) An image forming method, including:

an electrostatic latent image forming step of forming an electrostatic latent image on an electrostatic latent image bearer;

a developing step of developing the electrostatic latent image with the developer of (5), to form a visible image;

a transfer step of transferring the visible image onto a recording medium, and a fixing step of fixing a transferred image transferred onto the recording medium thereon.

What is claimed is:

1. A yellow toner, comprising:

a binder resin; and a pigment, wherein in a case where an intensity of a Raman spectrum of each toner particle at a wavenumber λ, at which a total intensity obtained by summing up Raman spectrums of toner particles that occur in a wavenumber range of 950 $cm^{-1}$ or greater and 3,250 $cm^{-1}$ or less in Raman spectroscopy of the yellow toner is maximum, is normalized to 1, and when a distribution is generated for 300 or more toner particles regarding a Localization Coefficient (LC) that is calculated according to a formula (3) below based on a $CH_c$ rate defined by a formula (1) below and a $CH_s$ rate defined by a formula (2) below where $I_n$ represents an integrated intensity of a Raman spectrum of a center portion of each toner particle that occurs in a wavenumber range of 2,750 $cm^{-1}$ or greater and 3,250 $cm^{-1}$ or less and an integrated intensity of a Raman spectrum of a surface portion of each toner particle that occurs in the wavenumber range of 2,750 $cm^{-1}$ or greater and 3,250 $cm^{-1}$ or less, and $I_{ave}$ represents an average value of the $I_n$, a percentage by number of toner particles having the LC that deviates from a median of the distribution of the LC by an absolute value of 25.0% or greater is 1.0% by number or greater and 25.0% by number or less, $$CH_c \text{ rate } (\%) = \left[(I_{nc} - I_{ave})/I_{ave}\right] \times 100 \quad (1)$$

$$CH_s \text{ rate } (\%) = \left[(I_{ns} - I_{ave})/I_{ave}\right] \times 100 \quad (2)$$

$$LC\ (\%) = CH_s \text{ rate } (\%) - CH_c \text{ rate } (\%) \quad (3)$$

where $I_{nc}$ represents the integrated intensity of the Raman spectrum of the center portion of an n-th toner particle in the wavenumber range of 2,750 $cm^{-1}$ or greater and 3,250 $cm^{-1}$ or less, $I_{ns}$ represents the integrated intensity of the Raman spectrum of the surface portion of the n-th toner particle in the wavenumber range of 2,750 $cm^{-1}$ or greater and 3,250 $cm^{-1}$ or less, and $I_{ave}$ represents the average value of the $I_n$ of the toner particles including their center portions and surface portions.

2. The yellow toner according to claim 1, wherein the percentage by number of the toner particles having the LC that deviates from the median of the distribution of the LC by the absolute value of 25.0% or greater is 5.0% by number or greater and 15.0% by number or less.

3. The yellow toner according to claim 1, wherein the percentage by number of the toner particles having the LC that deviates from the median of the distribution of the LC by an absolute value of 50.0% or greater is 3.0% by number or less.

4. The yellow toner according to claim 1, wherein the percentage by number of the toner particles having the LC that deviates from the median of the distribution of the LC by the absolute value of 50.0% or greater is 1.5% by number or less.

5. A developer, comprising:

the yellow toner of claim 1.

6. A process cartridge, comprising:

an electrostatic latent image bearer; and a developing member configured to develop an electrostatic latent image formed on the electrostatic latent image bearer with the developer of claim 5, wherein the electrostatic latent image bearer and the developing member are supported in an integrated state in the process cartridge, and the process cartridge is detachably attachable on a body of an image forming apparatus.

7. An image forming apparatus, comprising:

an electrostatic latent image bearer;

an electrostatic latent image forming member configured to form an electrostatic latent image on the electrostatic latent image bearer;

a developing member configured to develop the electrostatic latent image with the developer of claim 5, to form a visible image;

a transfer member configured to transfer the visible image onto a recording medium; and a fixing member configured to fix a transferred image transferred onto the recording medium thereon.

8. An image forming method, comprising:

forming an electrostatic latent image on an electrostatic latent image bearer;

developing the electrostatic latent image with the developer of claim 5, to form a visible image;

transferring the visible image onto a recording medium, and fixing a transferred image transferred onto the recording medium thereon.

* * * * *